(12) United States Patent
Takeuchi

(10) Patent No.: US 11,167,417 B2
(45) Date of Patent: Nov. 9, 2021

(54) ROBOT CONTROL DEVICE AND ROBOT SYSTEM

(71) Applicant: Seiko Epson Corporation, Tokyo (JP)

(72) Inventor: Kaoru Takeuchi, Azumino (JP)

(73) Assignee: Seiko Epson Corporation

( * ) Notice: Subject to any disclaimer, the term of this patent is extended or adjusted under 35 U.S.C. 154(b) by 240 days.

(21) Appl. No.: 16/257,164

(22) Filed: Jan. 25, 2019

(65) Prior Publication Data

US 2019/0232493 A1 Aug. 1, 2019

(30) Foreign Application Priority Data

Jan. 26, 2018 (JP) .............................. JP2018-011357

(51) Int. Cl.
  *B25J 9/16* (2006.01)
  *G06F 3/0482* (2013.01)
  *G05B 19/409* (2006.01)

(52) U.S. Cl.
  CPC ............ *B25J 9/1661* (2013.01); *B25J 9/161* (2013.01); *B25J 9/1605* (2013.01); *B25J 9/1633* (2013.01);
  (Continued)

(58) Field of Classification Search
  CPC ........ B25J 9/1661; B25J 9/161; B25J 9/1633; B25J 9/1605; G06F 3/0482; G05B 2219/39319; G05B 19/409
  See application file for complete search history.

(56) References Cited

U.S. PATENT DOCUMENTS

| 4,120,583 A | 10/1978 | Hyatt |
| 4,396,976 A | 8/1983 | Hyatt |

(Continued)

FOREIGN PATENT DOCUMENTS

| JP | 2010-092335 A | 4/2010 |
| JP | 2012-035348 A | 2/2012 |

(Continued)

OTHER PUBLICATIONS

Partial European Search Report for Patent Application No. EP 19153471.8 dated Aug. 5, 2018 (13 pages).

(Continued)

*Primary Examiner* — Jason Holloway
(74) *Attorney, Agent, or Firm* — Harness, Dickey & Pierce, P.L.C.

(57) ABSTRACT

A robot control device that creates a control program for work of a robot with a force detector, the device includes a processor, wherein the processor is configured to: display an input screen including an operation flow creation area for creating an operation flow of work on a display device; convert the created operation flow into a control program; and execute the control program to control the robot, wherein the input screen is configured to display a plurality of operation objects indicating a plurality of operations including an operation using force control, and one or more conditional branch objects indicating a conditional branch, as options, and wherein the operation flow creation area is configured to create an operation flow including the conditional branch by graphically placing an operation object selected from the plurality of operation objects and the conditional branch object.

12 Claims, 27 Drawing Sheets

(52) U.S. Cl.
CPC .......... *G06F 3/0482* (2013.01); *G05B 19/409* (2013.01); *G05B 2219/39319* (2013.01)

(56) References Cited

U.S. PATENT DOCUMENTS

| | | | |
|---|---|---|---|
| 6,901,560 | B1 | 5/2005 | Guerlain et al. |
| 10,163,365 | B2* | 12/2018 | Sisamos .................. G09B 9/00 |
| 10,279,478 | B2* | 5/2019 | Akan ...................... G06F 3/048 |
| 2004/0073404 | A1 | 4/2004 | Brooks et al. |
| 2006/0178778 | A1* | 8/2006 | Fuhlbrigge ........ G05B 19/0426 |
| | | | 700/264 |
| 2006/0287769 | A1 | 12/2006 | Yanagita et al. |
| 2007/0150102 | A1* | 6/2007 | Park .......................... G06F 8/34 |
| | | | 700/245 |
| 2009/0065578 | A1 | 3/2009 | Peterson et al. |
| 2012/0191245 | A1 | 7/2012 | Fudaba et al. |
| 2012/0317535 | A1 | 12/2012 | Schmirgel et al. |
| 2014/0188281 | A1* | 7/2014 | Nagai ................... B25J 9/0081 |
| | | | 700/264 |
| 2014/0214203 | A1* | 7/2014 | Inoue .................... B25J 9/1661 |
| | | | 700/245 |
| 2014/0298231 | A1* | 10/2014 | Saito ..................... G06F 3/0484 |
| | | | 715/771 |
| 2014/0358282 | A1 | 12/2014 | Izumi et al. |
| 2016/0075030 | A1 | 3/2016 | Takahashi |
| 2017/0320211 | A1* | 11/2017 | Akan ..................... B25J 9/1671 |
| 2019/0232492 | A1 | 8/2019 | Takeuchi |
| 2019/0283250 | A1 | 9/2019 | Iwai et al. |
| 2020/0074692 | A1 | 3/2020 | Ooba |

FOREIGN PATENT DOCUMENTS

| | | |
|---|---|---|
| JP | 2014-233814 A | 12/2014 |
| WO | 2017-005272 A1 | 1/2017 |

OTHER PUBLICATIONS

Extended European Search Report for Patent Application No. EP 19153471.8 dated Jan. 3, 2020 (12 pages).

* cited by examiner

FIG. 7

| CATEGORY | OBJECT | SUMMARY |
|---|---|---|
| CONTACTING | 1. CONTACTING | MOVE IN DESIGNATED DIRECTION AND STOP WHEN RECEIVING REACTION FORCE |
| | 2. RELAXED | COPY FORCE OF DESIGNATED AXIS TO BE ZERO |
| COPYING | 3. COPYING AND MOVING | MOVE DESIGNATED TRAJECTORY WHILE COPYING FORCE OF DESIGNATED AXIS TO BE ZERO |
| | 4. SURFACE MATCHING | PRESS WHILE COPYING ANGLE IN DESIGNATED DIRECTION AND MATCH SURFACE TO SURFACE |
| PROBING | 5. PRESSING AND PROBING | FIND HOLE BY PRESSING AND PROBING IN DESIGNATED TRAJECTORY |
| | 6. CONTACTING AND PROBING | FIND HOLE BY REPEATING CONTACTING OPERATION |
| PRESSING | 7. PRESSING | PRESS WITH DESIGNATED FORCE IN DESIGNATED DIRECTION (DESIGNATED AXIS INCLUDES "COPYING") |
| | 8. PRESSING AND MOVING | MOVE WHILE PRESSING WITH DESIGNATED FORCE IN DESIGNATED DIRECTION (DESIGNATED AXIS INCLUDES "COPYING") |

FIG. 14A

CASE OF SIX-AXIS FORCE SENSOR
PARAMETER OF CONTACTING OPERATION — PR

| PARAMETER | SETTING VALUE |
|---|---|
| CONTACTING DIRECTION | -Z ▼ |

CASE OF THREE-AXIS FORCE SENSOR
PARAMETER OF CONTACTING OPERATION — PR

| PARAMETER | SETTING VALUE |
|---|---|
| CONTACTING DIRECTION | -Z ▼ |

CASE OF SIX-AXIS ROBOT
PARAMETER OF PRESSING OPERATION — PR

| PARAMETER | SETTING VALUE |
|---|---|
| FORCE CONTROL IN Fx DIRECTION | COPYING |
| FORCE CONTROL IN Fy DIRECTION | COPYING |
| FORCE CONTROL IN Fz DIRECTION | 3N PRESSING |
| FORCE CONTROL IN Tx DIRECTION | COPYING |
| FORCE CONTROL IN Ty DIRECTION | COPYING |
| FORCE CONTROL IN Tz DIRECTION | OFF |

FIG. 15B

CASE OF SCARA ROBOT
PARAMETER OF PRESSING OPERATION — PR

| PARAMETER | SETTING VALUE |
|---|---|
| FORCE CONTROL IN Fx DIRECTION | COPYING |
| FORCE CONTROL IN Fy DIRECTION | COPYING |
| FORCE CONTROL IN Fz DIRECTION | 3N PRESSING |
| FORCE CONTROL IN Tz DIRECTION | COPYING |

FIG. 16A

CASE OF SIX-AXIS ROBOT
PARAMETER OF CONTACTING OPERATION — PR

| PARAMETER | SETTING VALUE |
|---|---|
| CONTACTING DIRECTION | −Z ▼ |

CASE OF SCARA ROBOT
PARAMETER OF CONTACTING OPERATION — PR

| PARAMETER | SETTING VALUE |
|---|---|
| CONTACTING DIRECTION | −Z ▼ |

CASE WHERE PROBING ROUTE IS SPIRAL
PARAMETER OF PRESSING AND PROBING OPERATION — PR

| PARAMETER | SETTING VALUE |
|---|---|
| PROBING ROUTE | SPIRAL |
| DIAMETER OF SPIRAL | 5mm |
| PITCH OF SPIRAL | 1mm |
| MOVING DISTANCE IN X DIRECTION | 0mm |
| MOVING DISTANCE IN Y DIRECTION | 0mm |
| MOVING DISTANCE IN Z DIRECTION | 0mm |

FIG. 17B

CASE WHERE PROBING ROUTE IS STRAIGHT LINE
PARAMETER OF PRESSING AND PROBING OPERATION — PR

| PARAMETER | SETTING VALUE |
|---|---|
| PROBING ROUTE | STRAIGHT LINE |
| DIAMETER OF SPIRAL | 5mm |
| PITCH OF SPIRAL | 1mm |
| MOVING DISTANCE IN X DIRECTION | 10mm |
| MOVING DISTANCE IN Y DIRECTION | 0mm |
| MOVING DISTANCE IN Z DIRECTION | 0mm |

ROBOT CONTROL DEVICE AND ROBOT SYSTEM

BACKGROUND

1. Technical Field

The present invention relates to a robot control device and a robot system.

2. Related Art

In a robot with a teaching playback robot system, a control program (job) representing work of a robot is created based on taught results. A teaching playback robot system means a system for operating a robot by executing a control program created by teaching. The procedure of creating the control program is called "teaching", and various teaching methods have been devised in the related art. JP-A-2014-233814 discloses a technology for displaying guidance information for setting parameters for operations of a robot on a screen of a teaching device in order to create a control program for a robot that executes force control using a force detector. A teacher (operator) can perform teaching by setting parameters according to the guidance information.

In the above-described related art, it is possible to set various parameters of operations. However, there is a problem that it is difficult to easily teach recovery and end processing when the operation in the work fails. Moreover, generally, since the teaching work of creating a control program of work requires skills, a technique which allows the teacher to more easily create the control program has been required.

SUMMARY

An advantage of some aspects of the invention is to solve the problems described above, and the invention can be implemented as the following aspects.

(1) According to a first aspect of the invention, a robot control device that creates a control program for work of a robot with a force detector is provided. The robot control device includes a display control unit that displays an input screen including an operation flow creation area for creating an operation flow of work on a display device; a conversion unit that converts the created operation flow into a control program; and a control execution unit that executes the control program to control the robot. The input screen is configured to display a plurality of operation objects indicating a plurality of operations including an operation using force control, and one or more conditional branch objects indicating a conditional branch, as options. The operation flow creation area is configured to create an operation flow including the conditional branch by graphically placing an operation object selected from the plurality of operation objects and the conditional branch object.

(2) In the robot control device, the input screen may further include, for each operation object included in the operation flow, a parameter setting area for setting a parameter defining an operation indicated by the operation object.

(3) In the robot control device, the display control unit may display a first type input screen and a second type input screen different from each other as the input screen for a first type work using the force detector and a second type work using a camera, and the first type input screen and the second type input screen may be configured such that the operation flow creation area and the parameter setting area have the same relative position relationship.

(4) In the robot control device, the parameter setting area may be further configured to set a parameter defining an end condition for ending the operation and a parameter defining a success determination condition for determining whether or not the operation succeeds.

(5) In the robot control device, for the work using the force detector, the end condition or the success determination condition may include a condition for executing determination based on a frequency of force measured by the force detector.

(6) In the robot control device, when an unacceptable parameter value is included in parameters set in the parameter setting area, the display control unit may display an alarm on an operation object indicating an operation in which the unacceptable parameter value is set in the operation flow creation area.

(7) In the robot control device, the display control unit may display a plurality of parameters in the parameter setting area for each operation object included in the operation flow, and, when one or more parameters are set for the operation object, change a state of the other parameters became unnecessary according to the set parameter to be a setting disabled state.

(8) In the robot control device, the display control unit may identify a type of the robot connected to the robot control device and set a state of a parameter became unnecessary according to the identified type of the robot to be the setting disabled state.

(9) In the robot control device, the display control unit may identify a type of a sensor provided in the robot and set a state of a parameter became unnecessary according to the identified type of the sensor to be the setting disabled state.

(10) In the robot control device, the display control unit may display the input screen for setting a work parameter of the work and set an operation parameter of an operation included in the operation flow based on the set work parameter.

(11) In the robot control device, based on the operation using the force detector, the display control unit may display a screen for setting an interruption permission timing for permitting interruption of the work when the robot control device receives a temporary stop signal from an outside.

The invention can be realized in various aspects other than the described above. For example, it can be realized in aspects of a robot system including a robot and a robot control device, a computer program for realizing functions of a robot control device, anon-transitory storage medium storing the computer program, and the like.

BRIEF DESCRIPTION OF THE DRAWINGS

The invention will be described with reference to the accompanying drawings, wherein like numbers reference like elements.

FIG. 7 is an explanatory diagram showing an example of operation categories and operation objects constituting an operation flow.

FIG. 14A is an explanatory diagram of an input example of operation parameters suitable for the six-axis force sensor.

FIG. 14B is an explanatory diagram of an input example of operation parameters suitable for the three-axis force sensor.

FIG. 15A is an explanatory diagram of a display example of operation parameters suitable for a six-axis robot.

FIG. 15B is an explanatory diagram of a display example of operation parameters suitable for a SCARA robot.

FIG. 16A is an explanatory diagram of a display example of operation parameters suitable for the six-axis robot.

FIG. 16B is an explanatory diagram of a display example of operation parameters suitable for the SCARA robot.

FIG. 17A is an explanatory diagram of an input prohibition example of operation parameters.

FIG. 17B is an explanatory diagram of an input prohibition example of operation parameters.

DESCRIPTION OF EXEMPLARY EMBODIMENTS

A. First Embodiment

Figure 1:
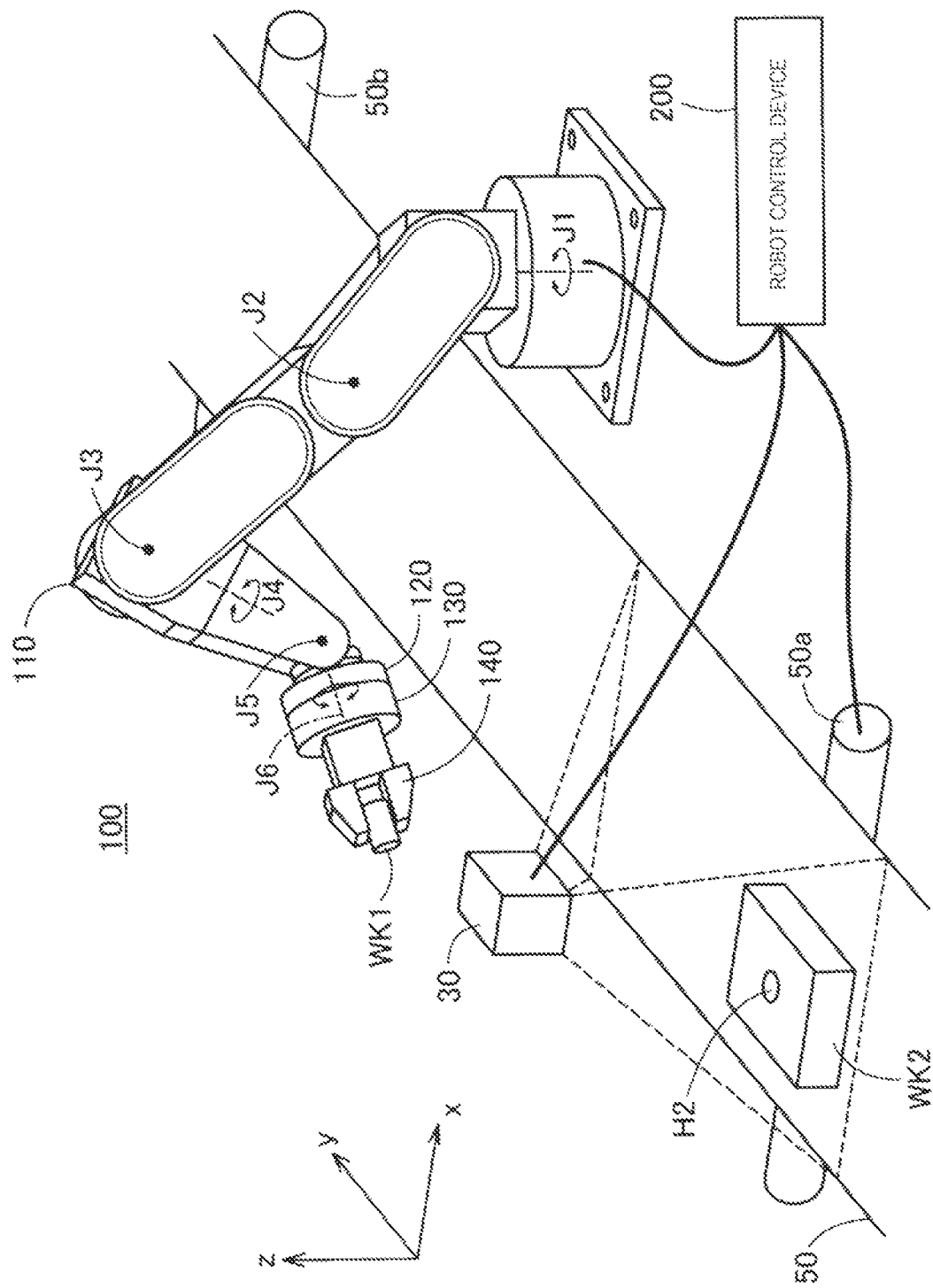
FIG. 1 is a perspective view of a robot system.

FIG. 1 is a perspective view of a robot system in a first embodiment. The robot system includes a camera 30, a transport device 50, a robot 100, and a robot control device 200. The robot 100 and the robot control device 200 are communicably connected via a cable or radio.

The robot 100 is a single arm robot that is used by attaching various end effectors on an arm flange 120 at a tip end of an arm 110. The arm 110 has six joints J1 to J6. The joints J2, J3, and J5 are bending joints and the joints J1, J4, and J6 are twisting joints. Various end effectors for performing work such as gripping and processing on an object (workpiece) are installed on the arm flange 120 at the tip end of the joint J6. A point in a vicinity of the tip end of the arm 110 can be set as a tool center point (TCP). The TCP is a position used as a reference of the positions of the end effectors, and can be set at any position. For example, a predetermined position on a rotation axis of the joint J6 can be set as the TCP. In the present embodiment, a six-axis robot is used, but a robot having another joint mechanism may be used.

The robot 100 can set the end effectors at any positions in any orientations within a movable range of the arm 110. A force detector 130 and an end effector 140 are installed on the arm flange 120. In the present embodiment, the end effector 140 is a gripper, but any other type of end effector can be used. The force detector 130 is a six-axis sensor that measures three-axis force acting on the end effector 140 and torque acting around the three axes. The force detector 130 measures magnitude of force parallel to three measurement axes orthogonal to each other in a sensor coordinate system which is a unique coordinate system, and the magnitude of torque around the three measurement axes. A force sensor as a force detector may be provided at any one or more joints J1 to J5 other than the joint J6. The force detector may only measure the force and torque in a direction of control, and a unit for directly measuring the force and torque like the force detector 130 or a unit for measuring the torque of the joint of the robot to obtain the force and the torque indirectly may be used. The force detector may measure the force and torque only in the direction of controlling force.

A coordinate system that defines a space in which the robot 100 is installed is called a robot coordinate system. A robot coordinate system is a rectangular coordinate system in three dimensions defined by an x axis and a y axis orthogonal to each other on a horizontal plane and a z axis with an upward vertical direction as a positive direction. The rotation angle around the x axis is represented by Rx, the rotation angle around the y axis is represented by Ry, and the rotation axis around the z axis is represented by Rz. Any position in the three-dimensional space can be represented by the position in the x, y, and z directions, and any orientation in the three-dimensional space can be represented by the rotation angle in the Rx, Ry, and Rz directions. Hereinafter, when expressed as "position" it may also mean position and orientation. When expressed as "force", it may also mean force and torque.

In the present embodiment, a workpiece WK2 is transported by the transport device 50. The transport device 50 includes transport rollers 50a and 50b. The transport device 50 can transport the workpiece WK2 placed on a transport surface by moving the transport surface by rotating these transport rollers 50a and 50b. The camera 30 is installed above the transport device 50. The camera 30 is installed such that the workpiece WK2 on the transport surface is in the visual field. A fitting hole H2 is formed on a surface of the workpiece WK2. The end effector 140 can perform work of fitting a workpiece WK1 gripped by the end effector 140 into the fitting hole H2 of the workpiece WK2. The fitting work may be performed in a state in which the transport surface is stopped, or, may be executed while moving the transport surface. The transport device 50 and the camera 30 can be omitted.

The robot control device 200 controls the arm 110, the end effector 140, the transport device 50, and the camera 30. The functions of the robot control device 200 are realized, for example, by a computer with a processor and a memory executing a computer program.

Figure 2:
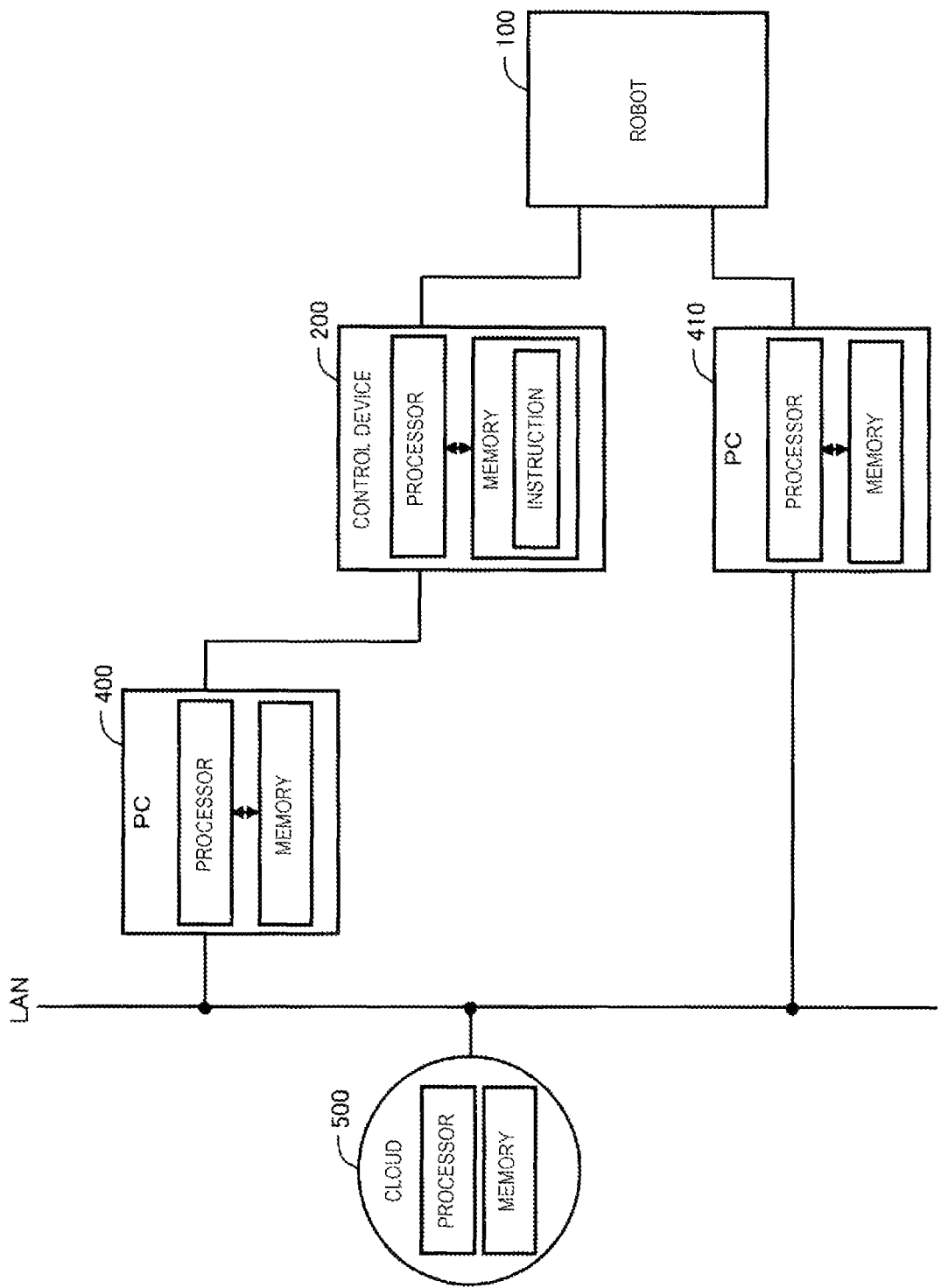
FIG. 2 is a conceptual diagram showing an example of a control device having a plurality of processors.

FIG. 2 is a conceptual diagram showing an example in which a control device of a robot is constituted by a plurality of processors. In the example, personal computers 400 and 410 and a cloud service 500 provided via a network environment such as LAN are illustrated in addition to the robot 100 and the control device 200 thereof. Each of the personal computers 400 and 410 includes a processor and a memory. A processor and a memory can be used in the cloud service 500. The control device of the robot 100 can be realized by using some or all of a plurality of these processors.

Figure 3:
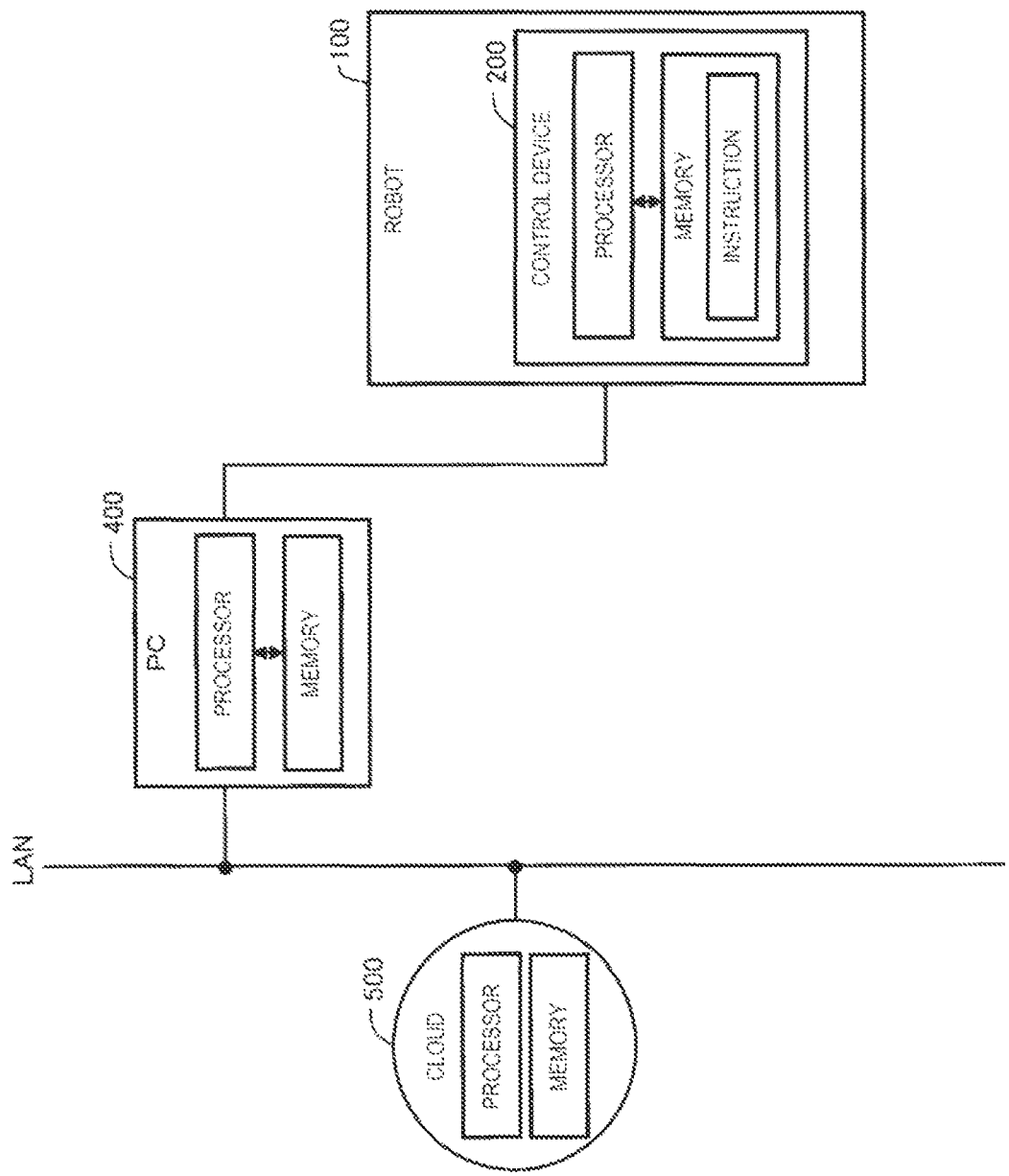
FIG. 3 is a conceptual diagram showing another example of the control device having the plurality of processors.

FIG. 3 is a conceptual diagram showing another example of a control device of a robot constituted by a plurality of processors. This example is different from FIG. 2 in that the control device 200 of the robot 100 is stored in the robot 100. The control device of the robot 100 can also be realized by using some or all of a plurality of these processors in this example.

Figure 4:
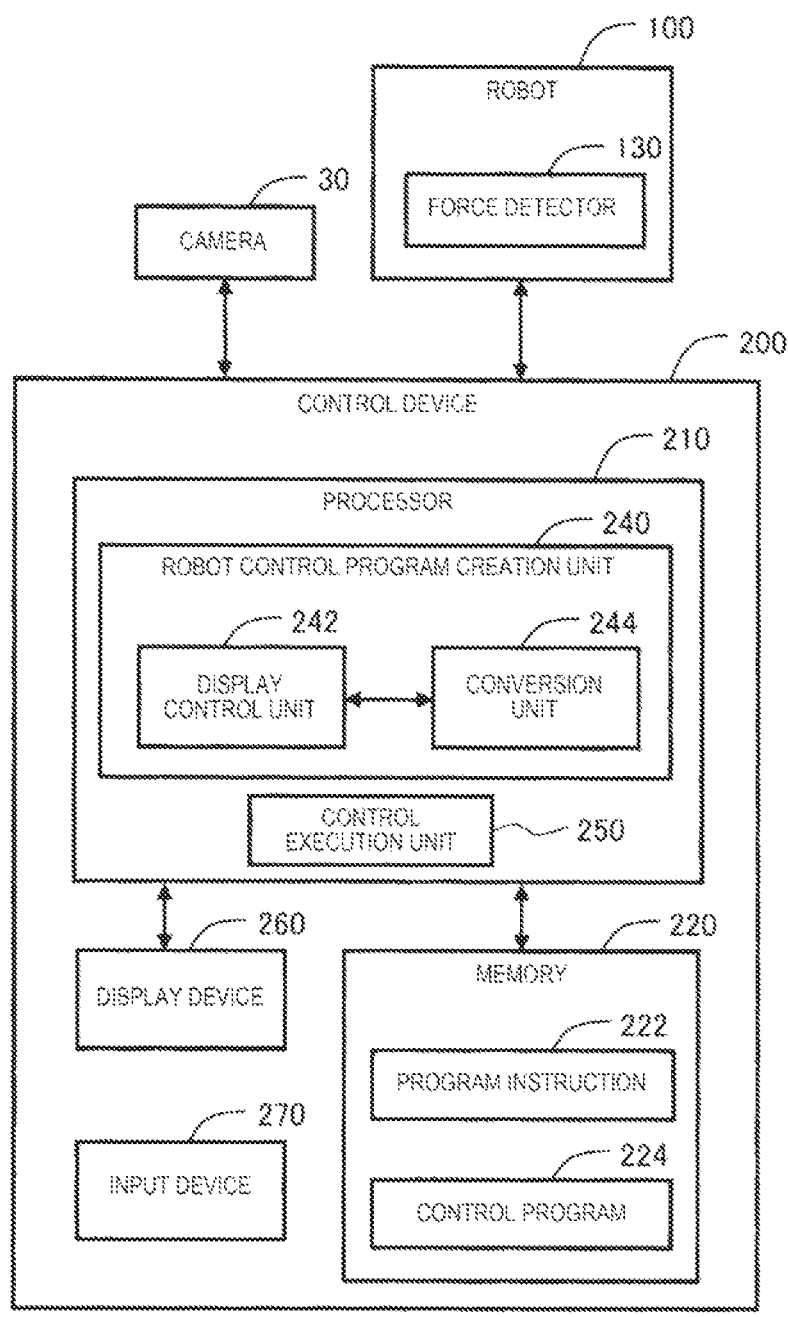
FIG. 4 is a functional block diagram of the control device.

FIG. 4 is a functional block diagram showing functions of the control device 200. The control device 200 includes a processor 210, a memory 220, a display device 260, and an input device 270. The memory 220 includes a main memory and a non-volatile memory. The processor 210 realizes functions of a robot control program creation unit 240 and a control execution unit 250 by executing a program instruction 222 stored in the memory 220 in advance. The robot control program creation unit 240 includes a display control unit 242 and a conversion unit 244. The display control unit 242 displays an input screen (described later) for creating an operation flow of work of the robot 100 on the display device 260. The conversion unit 244 converts the operation flow created in the input screen into a control program 224. The converted control program 224 is stored in the memory 220. The control program 224 may be written in a low level language such as a machine language, or, in a high level language such as a robot language. The control execution unit 250 causes the robot 100 to execute an operation of work by executing the control program 224 created as described above. The input device 270 is an input device such as a keyboard or a mouse, and the input and setting by a teacher are performed using the input device 270. Some or all of the functions of the robot control program creation unit 240 and the control execution unit 250 may be realized by a hardware circuit. The functions of the robot control program creation unit 240 will be described later.

Figure 5:
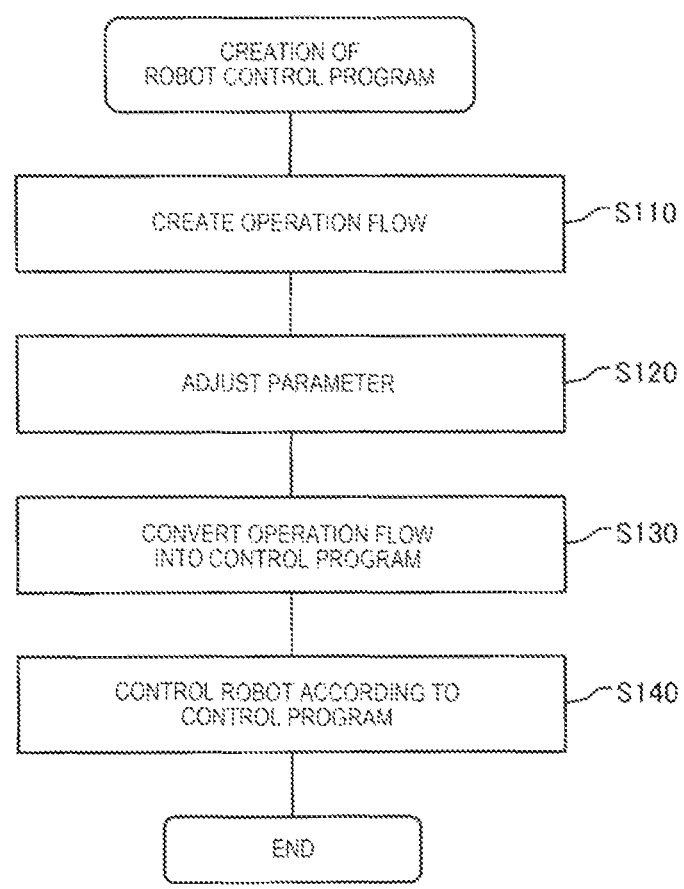
FIG. 5 is a flowchart of a procedure for creating a robot control program.

FIG. 5 is a flowchart showing a procedure for creating a robot control program, and FIGS. 6A to 6E are explanatory diagrams of the procedure. The process in FIG. 5 starts when the teacher operates an application program for executing the robot control program creation unit 240.

Figure 6A:
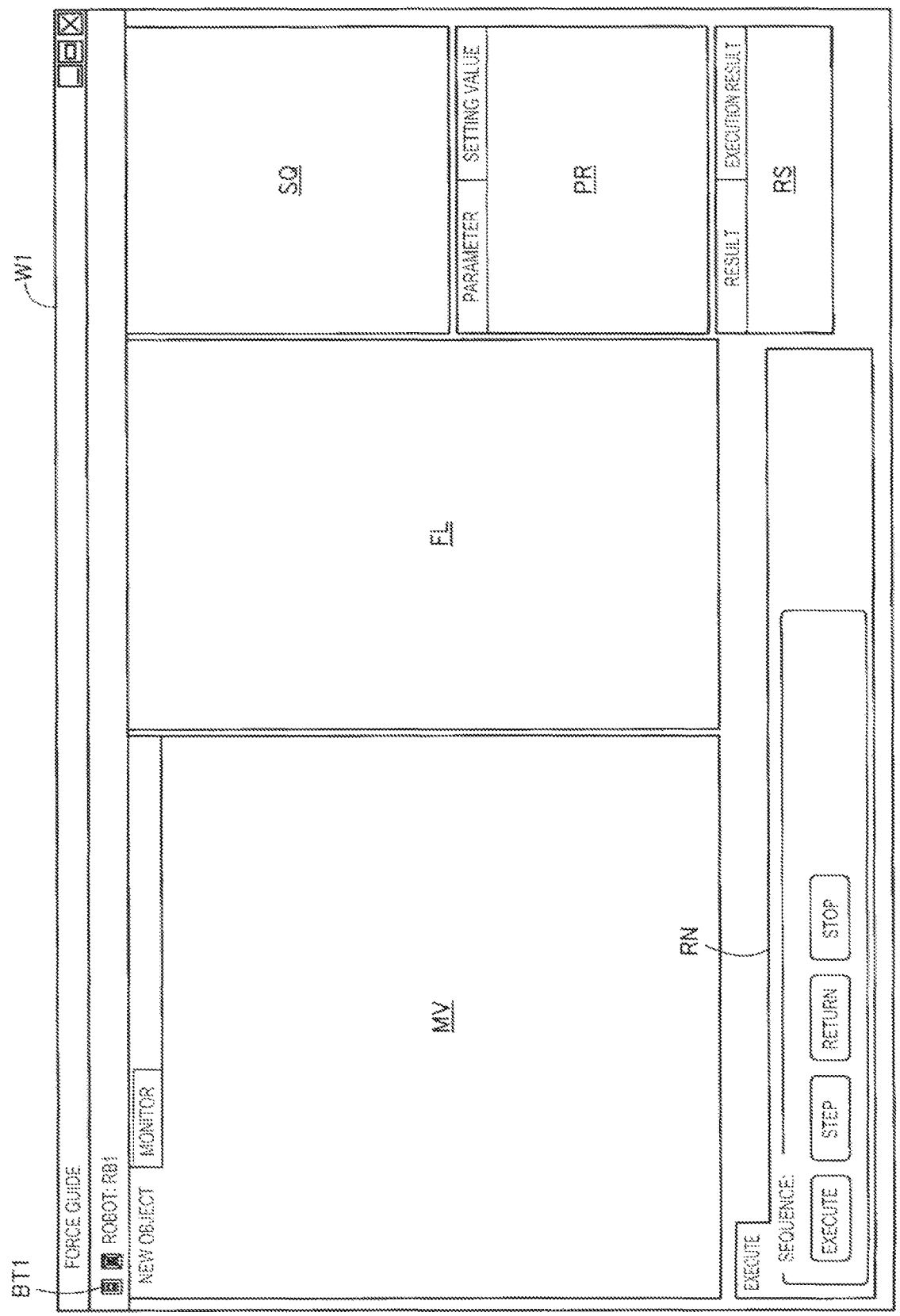
FIG. 6A is an explanatory diagram showing a procedure for creating a control program of work using a force detector.

FIG. 6A shows an example of a window W1 displayed on the display device 260 by the display control unit 242 when the robot control program creation unit 240 is operated. The window W1 corresponds to an input screen for creating an operation flow of work including one or more operations. The window W1 includes the following areas.

(1) Main view area MV is an area for displaying options of operation objects and conditional branch objects to be described later, execution results of a control program, and the like.

(2) Operation flow creation area FL is an area for displaying the operation flows in which a plurality of objects are graphically placed in an editable manner. The work represented by the operation flow is also called "sequence".

(3) Sequence display area SQ is an area for displaying a tree structure of the sequence.

(4) Parameter setting area PR is an area for setting work parameters related to the entire work or operation parameters related to individual operations.

(5) Result area RS is an area for displaying execution results of the control program.

(6) Execution indication area RN is an area for indicating execution of the control program.

In the example in FIG. 6A, a plurality of areas in the window W1 may or may not be divided into different frames. A button BT1 for indicating the start of the procedure for creating the control program of the work is provided on the upper left of the window W1. When the teacher presses the button BT1, an input screen for starting step S110 in FIG. 5 is displayed on the display device 260 by the display control unit 242. In the present specification, the operation of the teacher inputting work parameter into a box on the input screen will be referred to as "input", and receiving the parameter input by the teacher and changing into an inner value will be referred to as "setting".

Figure 6B:
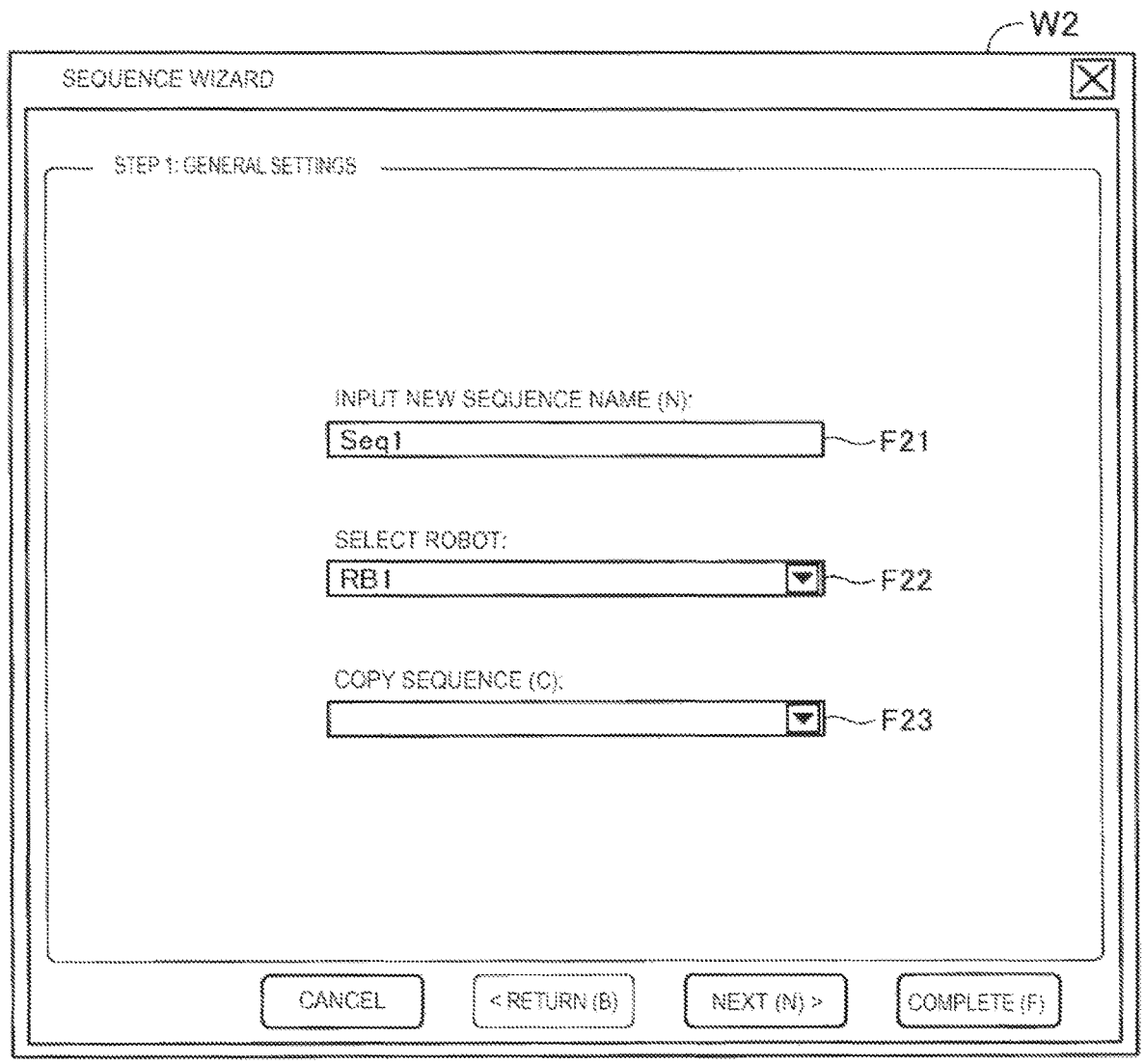
FIG. 6B is an explanatory diagram showing a procedure for creating a control program of work using a force detector.

FIG. 6B shows an example of a window W2 as an input screen for starting step S110. The window W2 includes the following areas.

(1) Sequence name setting area F21 is an area for setting a name for a new sequence. In the example in FIG. 6B, "Seq1" is input as the sequence name.

(2) Robot selection area F22 is an area for selecting the type of robot to be used from a plurality of options. In the example in FIG. 6B, an "RB1" type robot is selected.

(3) Sequence copy indication area F23 is an area for designating copying of an already created sequence. In this area, for example, sequence names of a plurality of sequences registered in the memory 220 in advance are displayed as a pull down menu. In the case where the sequence copy is used, settings described in FIG. 6C become unnecessary, and the procedure proceeds to the screen of FIG. 6D described later.

Figure 6C:
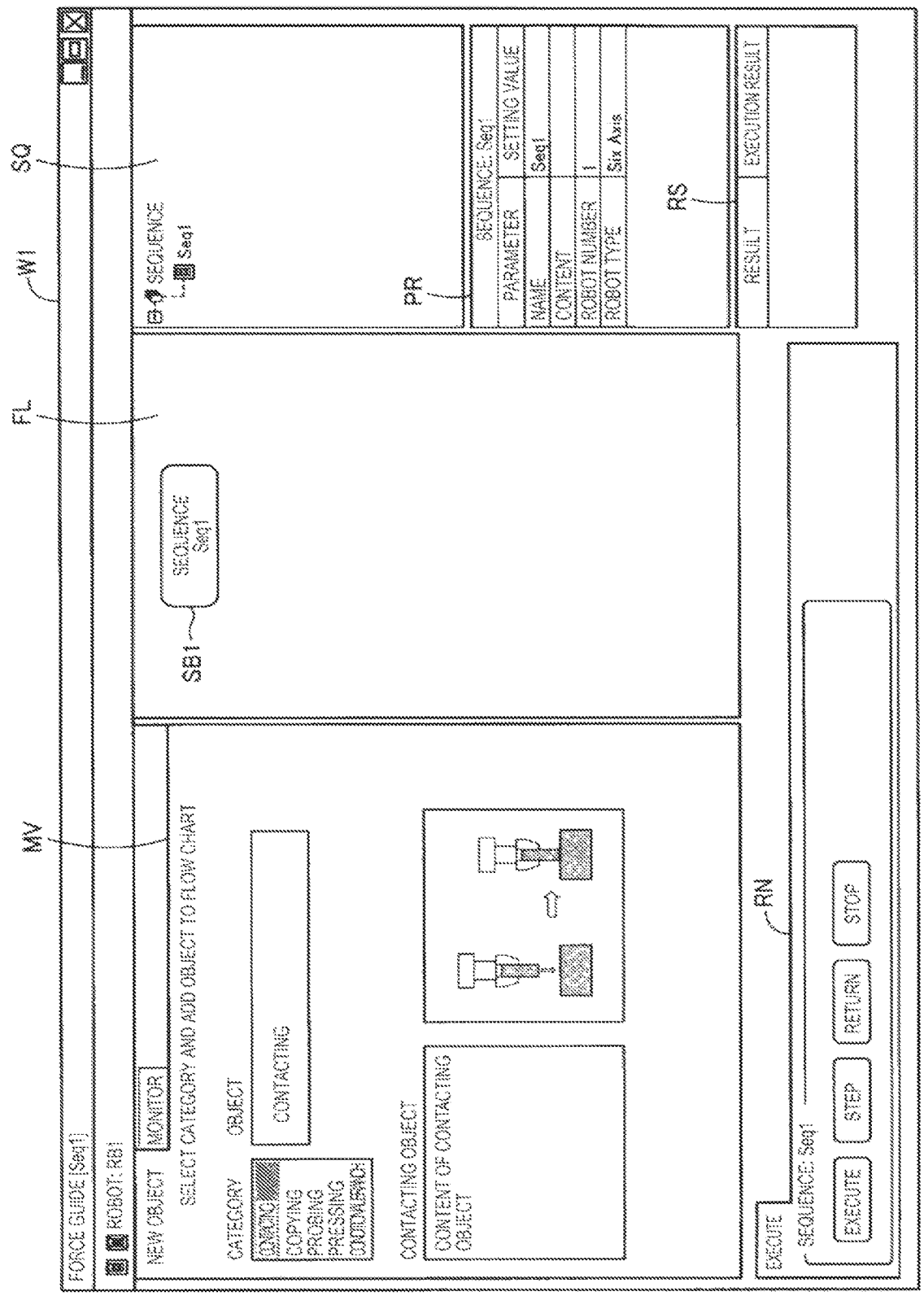
FIG. 6C is an explanatory diagram showing a procedure for creating a control program of work using a force detector.

In the present embodiment, the procedure proceeds to the screen of FIG. 6C without using the sequence copy. That is, in FIG. 6B, when the teacher presses a "next" button without inputting a field F23, the display content of the display device 260 is changed to the window W1 shown in FIG. 6C.

FIG. 6C shows a state of starting the creation of the operation flow in the window W1 shown in FIG. 6A. The following contents are displayed in each area on the window W1.

(1) Main view area MV: plurality of categories indicating the operations constituting the operation flow and the categories of the conditional branch, name and icon of the object belonging to each of the categories, the description of the contents of the object, and an image showing the outline of the object are displayed. The object displayed on the main view area MV can be arbitrarily added to the operation flow in the operation flow creation area FL by a work such as drag and drop.

Figure 6D:
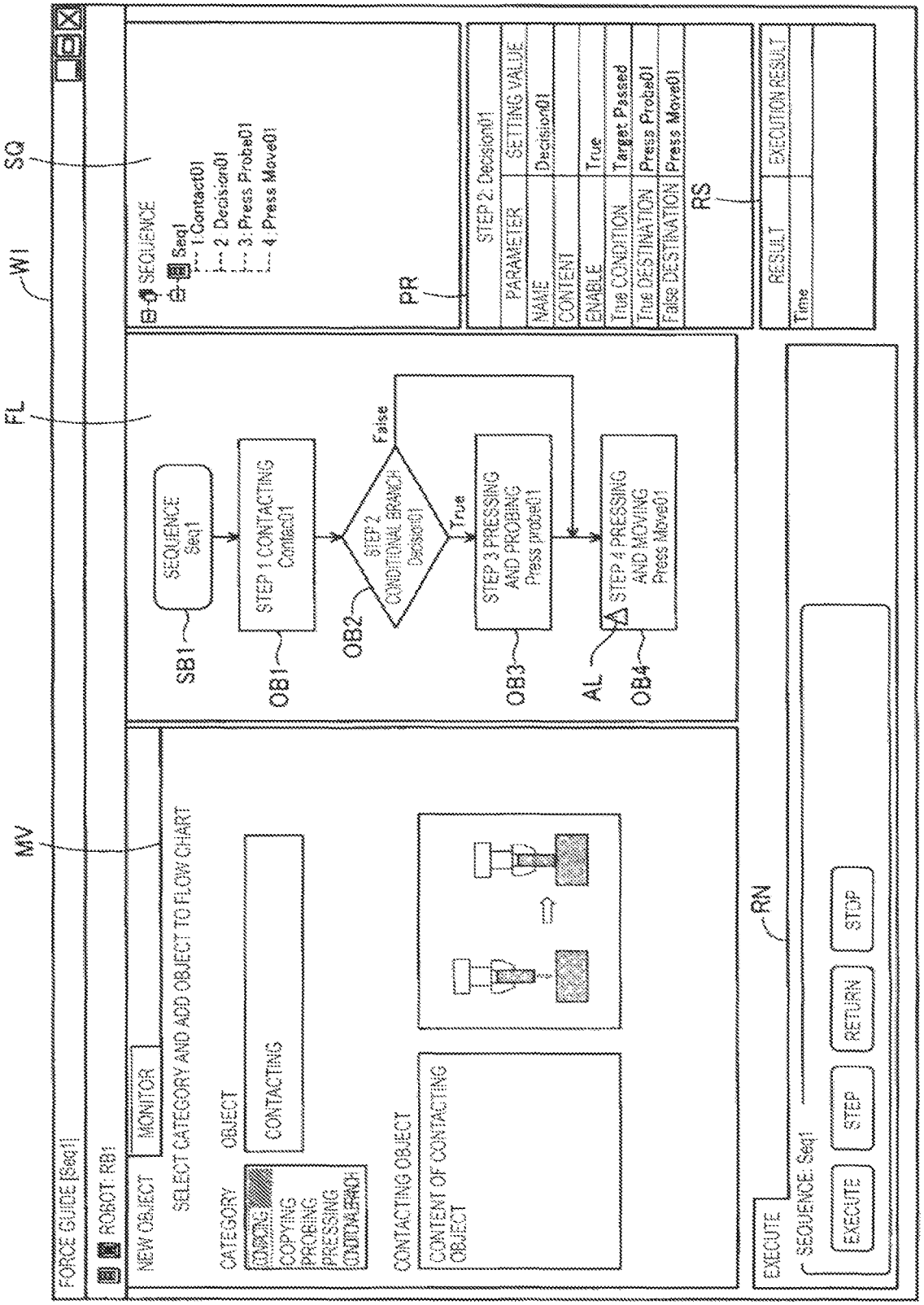
FIG. 6D is an explanatory diagram showing a procedure for creating a control program of work using a force detector.

(2) Operation Flow Creation Area FL: the operation flow in which one or more objects are graphically placed is displayed in an editable manner. As shown in FIG. 6D, when starting the creation of the operation flow, only a sequence block SB1 showing the label of the sequence is placed in the operation flow creation area FL.

(3) Sequence Display Area SQ: the tree structure of the sequence displayed in the operation flow creation area FL is displayed.

(4) Parameter Setting Area PR: when one of the blocks placed in the operation flow creation area FL is selected, the parameter corresponding to the selected block is displayed.

FIG. 6D shows a state in which the teacher created the operation flow in the operation flow creation area FL on the window W1. In this example, blocks of a contacting object OB1, a conditional branch object OB2, a pressing and probing object OB3, and a pressing and moving object OB4 are placed in this order below the sequence block SB1. In the block of each object, the name and icon of the object are displayed. Among the four objects OB1 to OB4, the three objects OB1, OB3, and OB4 are operation objects except for the conditional branch object OB2. The categories of the operation and the operation objects will be described later. In the operation flow, any object displayed in the main view area MV can be arbitrarily added, and any object in the operation flow can be deleted.

In FIG. 6D, when one of the blocks SB1 and OB1 to OB4 placed in the operation flow creation area FL is selected, the parameters corresponding to the selected block are displayed in the parameter setting area PR. For example, when the sequence block SB1 is selected, the work parameters related to the entire sequence are displayed. When one the objects OB1 to OB4 of the object is selected, the parameters related to the objects are displayed. In the example of FIG. 6D, the parameters related to the conditional branch block OB2 are displayed. These parameters are changed as necessary.

FIG. 7 shows an example of operation classifications and operation objects constituting an operation flow, and FIGS. 8A to 8D show outlines of operations of some operation objects. A plurality of operation objects can be categorized into the following four categories. All of these operations involve force control.

Category 1: Contacting

Contacting is an operation of moving in a designated direction and stopping when receiving reaction force.

Figure 8A:
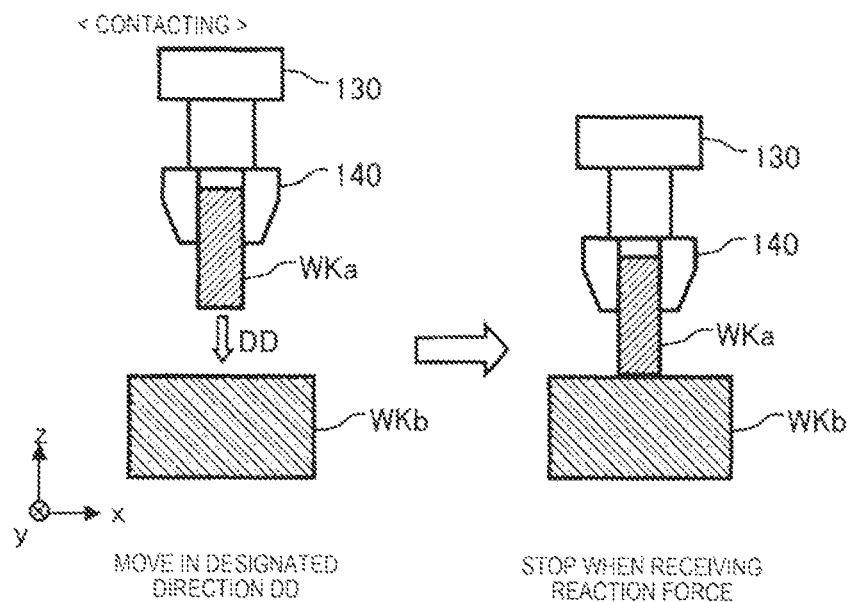
FIG. 8A is an explanatory diagram showing a schematic operation of a contacting object.

The category of the contacting operation includes a contacting object. As shown in FIG. 8A, in the contacting object, a workpiece WKa held by the end effector 140 is moved in a designated direction DD and the end effector 140 is stopped when the reaction force is measured by the force detector 130. The workpieces WKa and WKb shown in FIG. 8A have no relation to the workpieces WK1 and WK2 shown in FIG. 1, and are virtual workpieces for describing an outline of an operation. This point also applied to FIG. 8B to FIG. 8D described later.

Category 2: Copying

Copying is an operation of maintaining the state in which the force of a designated axis becomes zero.

The category of the copying operation includes the following three types of operation objects.

(a) Relaxed object is a copying operation so that the force of the designated axis becomes zero.

Figure 8B:
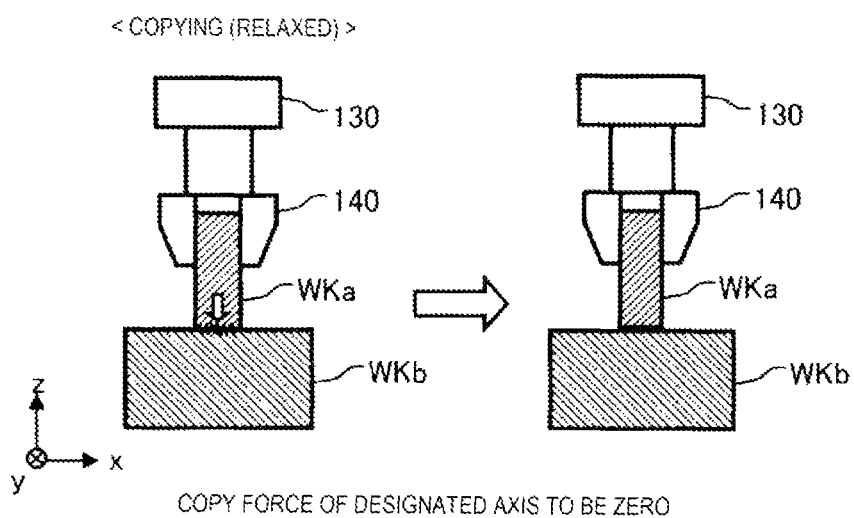
FIG. 8B is an explanatory diagram showing a schematic operation of a relaxed object.

As shown in FIG. 8B, in the relaxed object, the copying operation is executed so that the force of the designated axis becomes zero. In the example of FIG. 8B, the force in the z axis direction measured by the force detector 130 becomes zero by returning the end effector 140 in the −z direction when the force between the workpieces WKa and WKb in the z axis direction is not zero.

(b) Copying and moving object is an operation of moving along a designated trajectory while copying so as to set the force of the designated axis to zero.

(c) Surface matching object is an operation of copying and pressing at an angle in the designated direction to match the surface to surface.

Category 3: Probing

Probing is an operation of probing a position where the force of the designated direction becomes zero.

The category of the probing operation includes the following two types of operation objects.

(a) Pressing and probing object is an operation of finding a hole by pressing and probing along the designated trajectory.

Figure 8C:
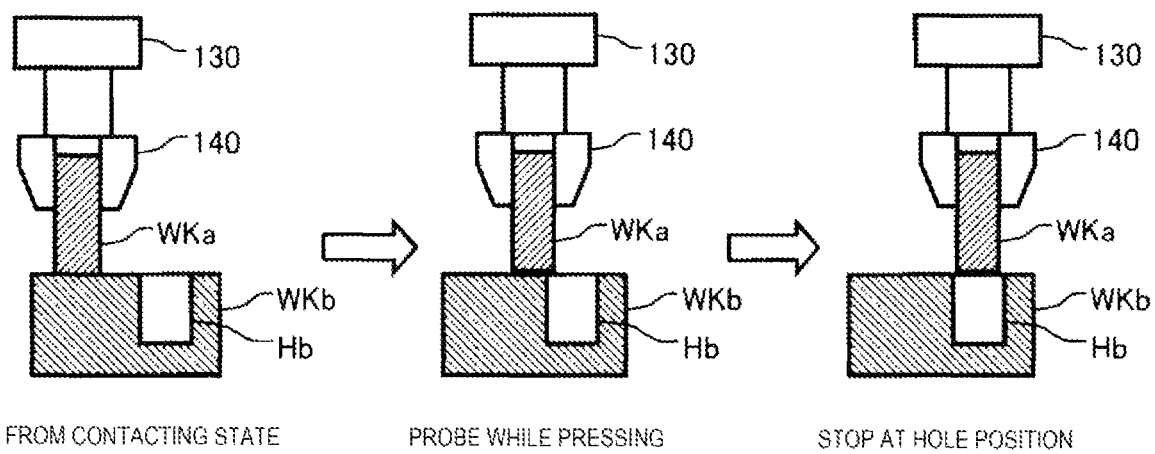
FIG. 8C is an explanatory diagram showing a schematic operation of a pressing and probing object.

As shown in FIG. 8C, in the pressing and probing object, a position where the force in the designated direction becomes zero is probed while the workpiece WKa held by the end effector 140 is pressed in the designated direction and the end effector is stopped at a position of a hole Hb. As a probing trajectory, one trajectory can be selected from a plurality of candidates such as a linear trajectory and a spiral trajectory.

(b) Contacting and probing object is an operation of finding a hole by repeating the contacting operation.

Category 4: Pressing

Pressing is an operation of pressing with designated force in the designated direction.

The category of the pressing operation includes the following two types of operation objects.

(a) Pressing (simple pressing) object is an operation of pressing with designated force in the designated direction. In this operation, "copying" operation can be executed with respect to other designated axes.

Figure 8D:
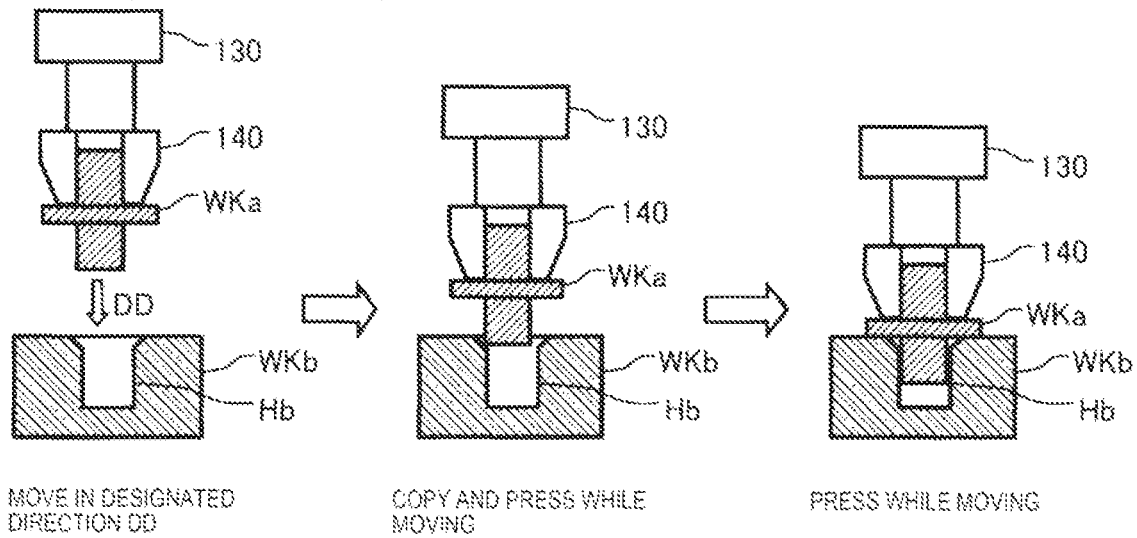
FIG. 8D is an explanatory diagram showing a schematic operation of a pressing and moving object.

(b) Pressing and moving object is an operation of moving while pressing with designated force in the designated direction. In this operation, "copying" operation can be executed with respect to other designated axes. As shown in FIG. 8D, in the pressing and moving object, the end effector 140 is moved in the designated direction DD and pressed with designated force, and then, is moved in a direction different from the designated direction while maintaining (that is copying) the pressing with designated force. In the example of FIG. 8D, an operation of inserting the workpiece WKa held by the end effector 140 into the hole Hb of a workpiece WKb is executed by the pressing and moving.

As parameters of four objects OB1 to OB4 shown in FIG. 6D, for example, the following parameters can be set. In particular, with respect to the operation objects OB1, OB3, and OB4, a parameter defining end condition of an operation and a parameter defining a success determination condition of an operation can be set.

Parameters of Contacting Object OB1

(1) Example of Operation Parameters Defining Operation

Contacting direction: −Z direction (contacting direction is automatically set from the fitting direction set as the work parameter)

Estimated contacting distance: 10 mm

Operation speed: 5 mm/s

Force control gain at contacting: 1.0

(2) Example of End Condition
  Threshold value of force: 5 N (operation stops when the force exceeds 5 N)
(3) Example of success determination condition
  Success determination condition: time-out time=3 seconds (In the case where the end condition is satisfied until the time-out time, it is determined that the operation is successful, and in the case where the end condition is not satisfied, it is determined that the operation is failed)
  Operation on failure: continue the sequence (Designate how to proceed when the operation is failed. It is possible to designate the continuance of the sequence or the end of the sequence)

Parameters of Conditional Branch Object OB2
(1) Example of Determination Condition of Conditional Branch
  Determination target object: Contact01 (Conditional branch is executed according to the result of the determination target object)
  Conditions under which determination of the conditional branch is true: successful operation (It is possible to designate either case where the operation of the determination target object is successful or the determination target object is failed)
(2) Example of Destination of Conditional Branch
  Destination when the determination is true: PressProbe01 (any position in the operation flow can be designated)
  Destination when the determination is false: PressMove01 (any position in the operation flow can be designated)

Parameters of Pressing and Probing Object OB3
(1) Example of Operation Parameters Defining Operation
  Route: spiral (Spiral or straight line can be designated as a probing route)
  Route shape:
    Diameter of spiral: 5 mm
    Pitch of spiral: 1 mm
  Operation speed: 5 mm/s
  Pressing direction: −Z direction (pressing direction is automatically set from the fitting direction set as the work parameter)
  Pressing force: 3 N
  Force control gain during pressing: 2.0
(2) Example of End Condition
  Make AND conditions of the following conditions C1 and C2:
    Condition C1: threshold value of force (below the threshold value of force)
    Condition C2: threshold value of position movement amount (moved to the range exceeding the threshold value from the object start position)
(3) Example of Success Determination Condition
  Success determination condition: in the case where the end condition is satisfied by the end of the route, it is determined that the operation is successful, and in the case where the end condition is not satisfied, it is determined that the operation is failed.
  Operation on failure: end the sequence Parameters of Pressing and Moving Object OB4
(1) Example of Operation Parameters Defining Operation
  Route: straight line
  Moving direction: −Z direction (moving direction is automatically set from the fitting direction set as the work parameter)
  Moving distance: 30 mm
  Moving speed: 10 mm/s
  Force control in Fx, Fy, Fz direction: copying
  Force control in Fz direction: 3 N pressing
  Force control in Tx, Ty direction: copying
  Force control in Tz direction: OFF
  Force control gain: the gain of Fx is 1, the gain of Fy is 1, the gain of Fz is 2, the gain of Tx is 300, and the gain of Ty is 300
(2) Example of End Condition
  Make AND conditions of the following conditions C1 and C2:
    Condition C1: force acceptable value (the range of the force in the pressing direction is within the range of target force±acceptable value)
    Condition C2: threshold value of position movement amount (moved to the range exceeding the threshold value from the object start position)
(3) Example of Success Determination Condition
  Success determination condition: in the case where the end condition is satisfied by the end of the route, it is determined that the operation is successful, and in the case where the end condition is not satisfied, it is determined that the operation is failed.
  Operation on failure: end the sequence As can be understood from these examples, in the present embodiment, since it is possible to display the parameter setting area PR in which the parameters defining the operation, the parameters defining the end condition of the operation, and the parameters defining the success determination condition of the operation can be set, it is possible to easily create a control program including end of operation and success/failure determination. It may be a mode in which it is not possible to set one or both of the parameters defining the end condition of the operation, the parameters defining the success determination condition of the operation.

In the example of FIG. 6D, an alarm mark AL is displayed with respect to the fourth operation object OB4. The alarm mark AL is a mark displayed when an unacceptable parameter value is included in the parameters set in the parameter setting area PR with respect to the operation object OB4. Items and values of the defective parameters may be displayed when the mouse pointer is moved over the alarm mark AL. In a case where the teacher sees the alarm mark AL, since the teacher knows that there is a deficiency in the parameter of the operation object OB4, the deficiency in the parameter can be corrected. An alarm or an error may be displayed at another position in the screen instead of displaying the alarm mark AL in the operation object OB. For example, alarms or errors may be displayed in the tree of the sequence display area SQ, or, alarms or errors related to the same operation object OB may be displayed at a plurality of positions. In the case where there is a deficiency in the work parameter, an alarm or an error may be displayed. The display of an alarm or an error of such work parameter may be displayed in, for example, the tree of the sequence display area SQ.

The end condition or the success determination condition of the operation parameter can be set to include a condition of executing determination based on the frequency of the force measured in the force detector 130.

Figure 9:
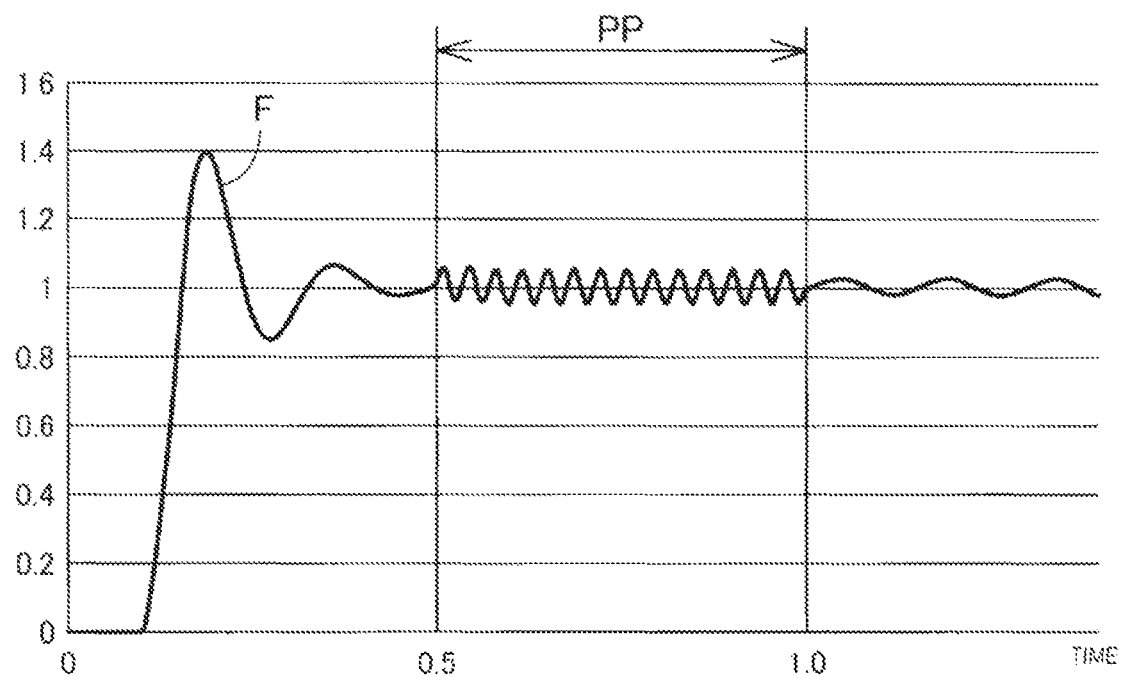
FIG. 9 is a graph showing an example of change in force measured by the force detector.

FIG. 9 is a graph showing an example of change in force F measured by the force detector 130. In this example, the force F vibrates during a period PP after 0.5 seconds from the start of the operation. Such a vibration can be an effect of a peripheral device (for example, operation of conveyor). In order to prevent the operation of the robot 100 from being influenced by the peripheral device, the control device 200 may execute frequency analysis of temporal change of the force F, and the detection of the power spectrum of the frequency designated in advance being equal to or lower than the threshold value or equal to or higher than the threshold value may be used as apart of the end condition or the success determination condition. In the example of FIG. 9, after the lapse of the period PP, that is, after the power spectrum of the frequency designated in advance is equal to or lower than the threshold value, it is possible to determine the end of the operation or the successor failure of the operation. Since the condition for determining based on the frequency of the force measured by the force detector 130 is used, it is possible to more correctly determine the presence or absence of the end of the operation or the success or failure of the operation even in a case where vibration is generated by the operation as shown in FIG. 9.

When the work parameters are set for the work in which the operation flow is created as shown in FIG. 6D, it is preferable that some of the operation parameters of the operation included in the operation flow are automatically set from the work parameters.

Figure 10:
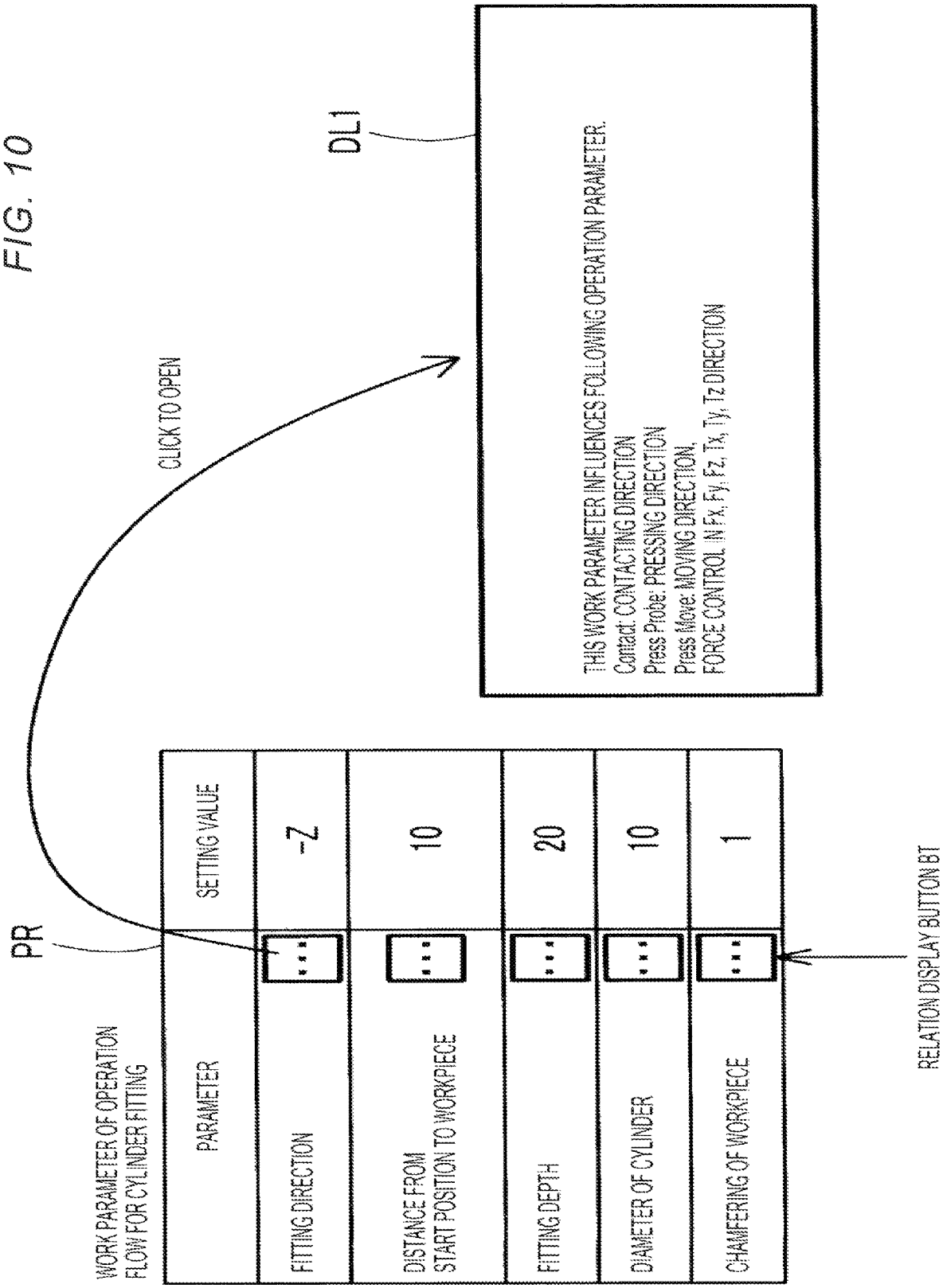
FIG. 10 is an explanatory diagram showing an example of a relationship between work parameters and operation parameters.

FIG. 10 is an explanatory diagram showing an example of a relationship between work parameters and operation parameters. Here, an example of work parameters displayed in the parameter setting area PR on the window W1 (FIG. 6D) is shown. These work parameters are, for example, displayed in the parameter setting area PR by selecting the sequence block SB1 in the operation flow creation area FL. In FIG. 10, when clicking a relationship display button BT of a specific parameter in the parameter setting area PR, a dialog DL1 showing operation parameters influenced by the work parameters is displayed. In this example, among the work parameters of cylinder fitting work, when the relationship display button BT of the fitting direction is clicked, it is displayed in the dialog DL1 the fitting direction affects the contacting direction of contacting operation, the pressing direction of the pressing and probing operation, the moving direction of the pressing and moving operation, and the force control in the six axes directions. The teacher can check the relationship between the work parameters and the operation parameters of each operation from the dialog DL1.

The operation parameter of the force control operation automatically set from the work parameter is not limited to the direction of force control, and other operation parameters may be automatically set according to the work parameter. For example, the moving amount while pressing of the pressing and moving operation (moving amount in the −Z direction at the right end of FIG. 8D) may be automatically set from workpiece information (for example, fitting depth of workpiece) of the work parameter. As an automatic parameter setting mode of the parameter, one mode may be selected from a first mode in which only the work parameter can be changed, a second mode in which only the operation parameter can be changed, and a third mode in which both of the work parameter and the operation parameter can be changed. In this way, a novice can create a work sequence using only the work parameter, and an expert can perform further detailed corrections using the operation parameter. In a case where the work parameter and the operation parameter are inconsistent, for example, in a case where the contacting direction is set in the −X direction when the fitting direction is set in the −Z direction in the example of FIG. 10, it is preferable that the operation parameter is edited with the work parameter as correct.

When the operation flow of the work is created as shown in FIG. 6D, it is possible to cause the robot 100 to execute the work according to the operation flow. For example, when the teacher presses the "execute" button in the execution instruction area RN of FIG. 6D, the conversion unit 244 (FIG. 4) converts the operation flow into a control program, and the control execution unit 250 causes the robot 100 to execute the work by executing the control program. This corresponds to a trial of the control program.

Figure 11A:
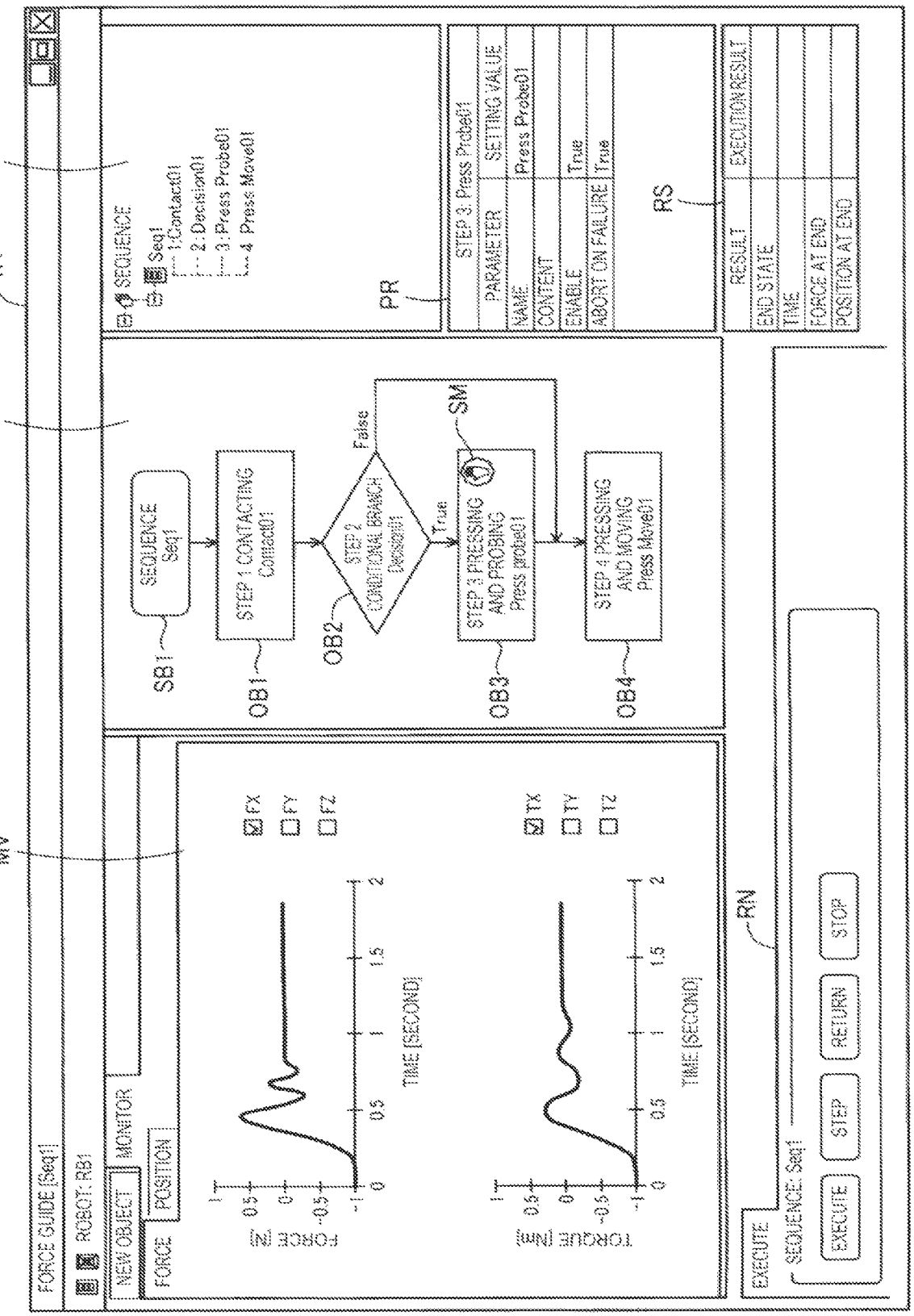
FIG. 11A is an explanatory diagram showing an example of a screen showing a result of work executed according to an operation flow.

FIG. 11A is an explanatory diagram showing an example of a screen showing a result of work executed according to an operation flow. In this example, an execution stop mark SM is set in the third operation object OB3 in the operation flow creation area FL. The execution stop mark SM means temporal stopping of the execution in the operation object OB3. The execution stop mark SM can be set, for example, using the context menu of each operation object. The context menu is a menu displayed by right-clicking the mouse.

In the main view area MV, the temporal change of the force Fx in the X axis direction and the torque Tx around the X axis are displayed among the plurality of force measured by the force detector 130 at the time of executing the operation flow. In the main view area MV, it is possible to select and display any one or more temporal changes of force of the plurality of forces measured by the force detector 130. It is also possible to display the temporal change of the measured position of the TCP and the temporal change of the difference between the target position and the measured position of the TCP on the main view area MV. The period of displaying the result in the main view area MV can be an operation period of any one of the operation objects in the operation flow, or can be the entire period from the start to stop of the execution. For example, when any operation object is selected in the operation flow creation area FL, the execution result of the operation period of the operation object is displayed. When the sequence block SB1 is selected, the result of the entire period from the start to stop of the execution is displayed. The period of displaying result in the main view area MV may be an operation period over a plurality of continuing operation objects. The information of some execution results of the control program is also displayed in the result area RS. For example, for any operation object, it is possible to display the end state of the operation (success or failure), time required for the operation, force at the end of the operation, the position at the end of the operation, and the like in the result area RS. Other types of results than the one shown in FIG. 11A may be displayed in the main view area MV. For example, information related to the robot, such as the speed of the robot and the angle of each joint may be displayed.

It is preferable that the window W1 is further configured to include a field or a button for saving the data as the executed result in a desired place. By making it possible to store the execution result data, it is possible to compare with the past data in the adjustment described later. The data storage destination may be within the robot control device 200, or in the computer or the cloud connected to the robot control device 200. The data format may be a database or a file format.

The teacher can observe the execution result of the control program and adjust the parameters of individual objects as necessary (Step S120 in FIG. 5). The adjustment can be executed by changing the parameters of the object displayed in the parameter setting area PR in the state where any one of the objects OB1 to OB4 in the operation flow creation area FL is selected. As a specific example, for example, in a case where the force when contacting in the contacting operation is excessively large, the parameters of the contacting object are adjusted so as to lower the speed in the contacting operation.

Figure 11B:
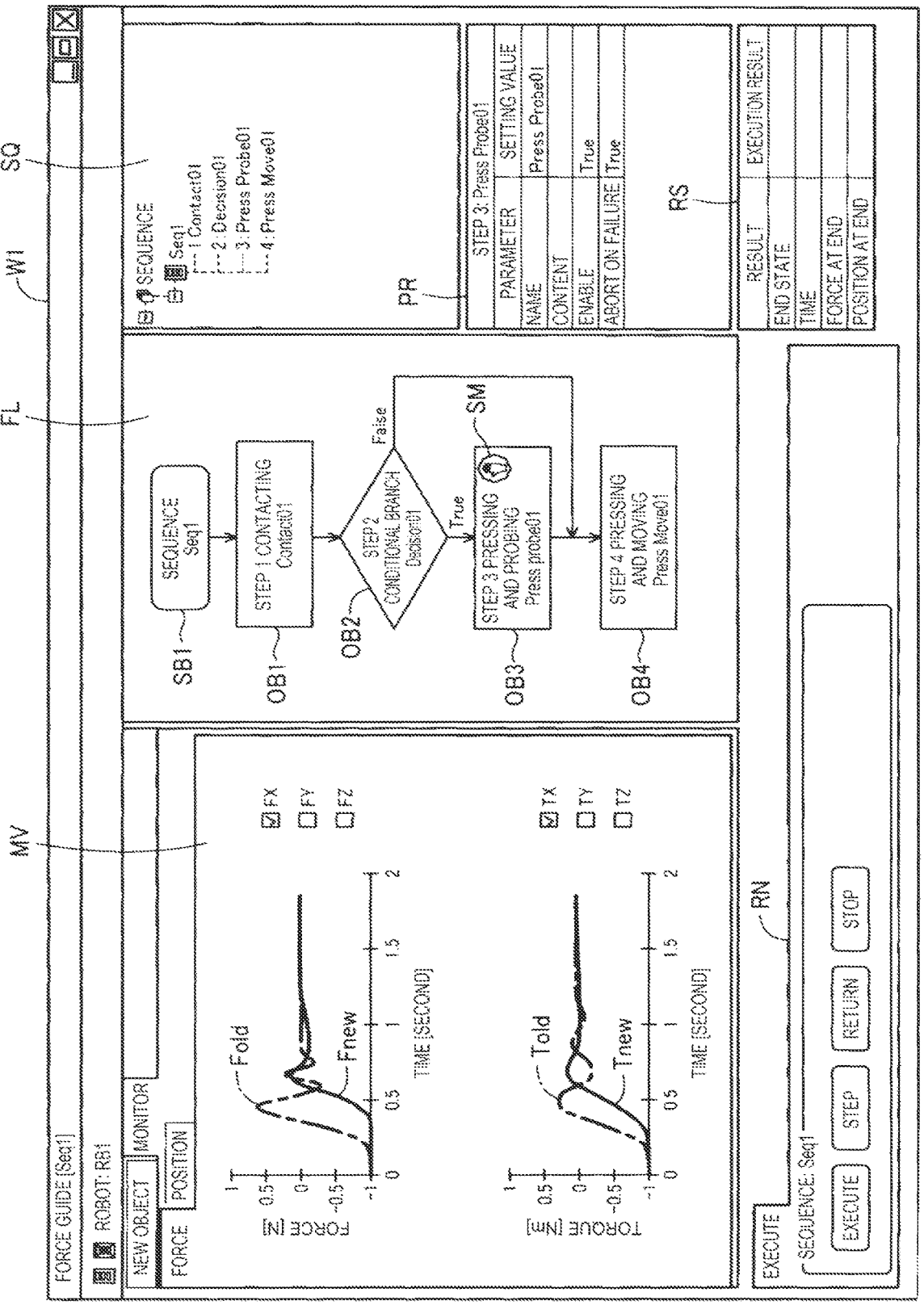
FIG. 11B is an explanatory diagram showing an example of a screen showing a re-execution result after adjustment of the parameters.

FIG. 11B shows an example of the result re-executing the control program after the adjustment of the parameters. In this example, the peaks of the force Fnew and Tnew after the adjustment are lower than the peaks of the force Fold and Told before the adjustment. In the window W1, since it is possible to perform a trial of the adjustment of the parameters of the object of the operation flow generated in the operation flow creation area FL and the work according to the operation flow, an operation flow that runs appropriately can be easily created. However, such adjustment and trial processes may be omitted. As described in FIG. 11A, in the case where the data of the past execution result is saved, it is also possible to display the past data.

When the operation flow is completed as described above, the conversion unit 244 converts the operation flow into a control program according to the indication of the teacher in step S130 in FIG. 5. The indication can be performed, for example, by selecting "create control program" from the context menu of the operation flow creation area FL. It is preferable that any one method of the following three types of methods can be selectively performed for the conversion from the operation flow to a control program and execution.

(1) The operation flow is converted into a control program of the low level language. The teacher accesses and executes the converted control program of the low level language from the control program of the high level language separately written by the teacher. In this case, after the teacher creates work sequence, the control program of the sequence can be called out and executed for example, by writing "FGRun sequence name" among the control programs of the high level language separately written by the teacher. This is the most basic execution method.

(2) The operation flow is converted into a control program of the high level language to execute the control program.

(3) The operation flow is converted into a control program of the low level language, and the control program is directly executed.

In the following description, the case where the above-described method (2) is mainly executed will be described.

Figure 12:
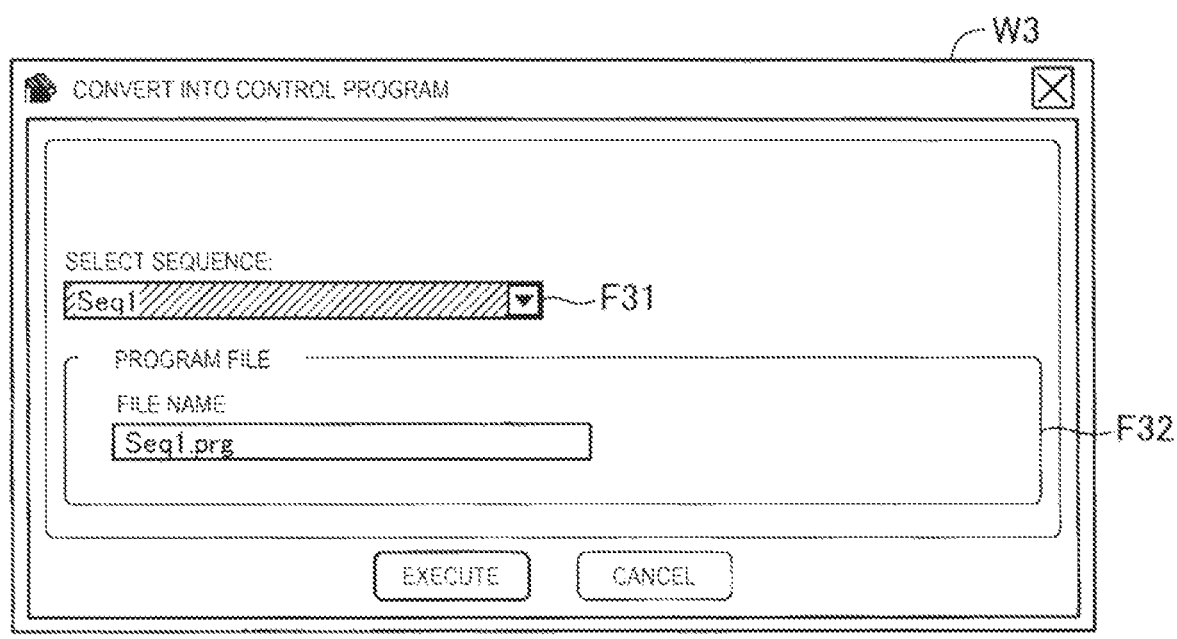
FIG. 12 is an explanatory diagram showing an example of an input screen when the operation flow is converted into a control program.

FIG. 12 shows an example of a window W3 as an input screen displayed when the operation flow is converted into a control program according to the indication of the teacher. This window W3 includes a sequence selecting area F31 for selecting a sequence (that is an operation flow) to be converted into a control program and a program file name setting area F32 for setting the file name of the control program. The sequence selecting area F31 may be omitted. The window W3 may be configured to include an area for designating information such as a storage destination of parameters. In the window W3, when the "execution" button is pressed, the operation flow is converted into a control program by the conversion unit 244, and the control program is stored in the memory 220.

In step S140 of FIG. 5, the robot control device 200 controls the robot and causes the robot to execute the work according to the control program created in step S130. This work can be executed as a checking work for checking the operations of the robot 100 on the production line or an original work for manufacturing a product on the production line.

In the above-described description, a procedure of creating an operation flow and a control program of work using the force detector 130 is described. However, in the present embodiment, it is also possible to create an operation flow and a control program of work using the camera 30 (imaging device). In the present specification, the work using the force detector 130 is called "first type work", and the work using the camera 30 is called "second type work". The camera 30 is not used in the first type work, and the force detector 130 is not used in the second type work.

Figure 6E:
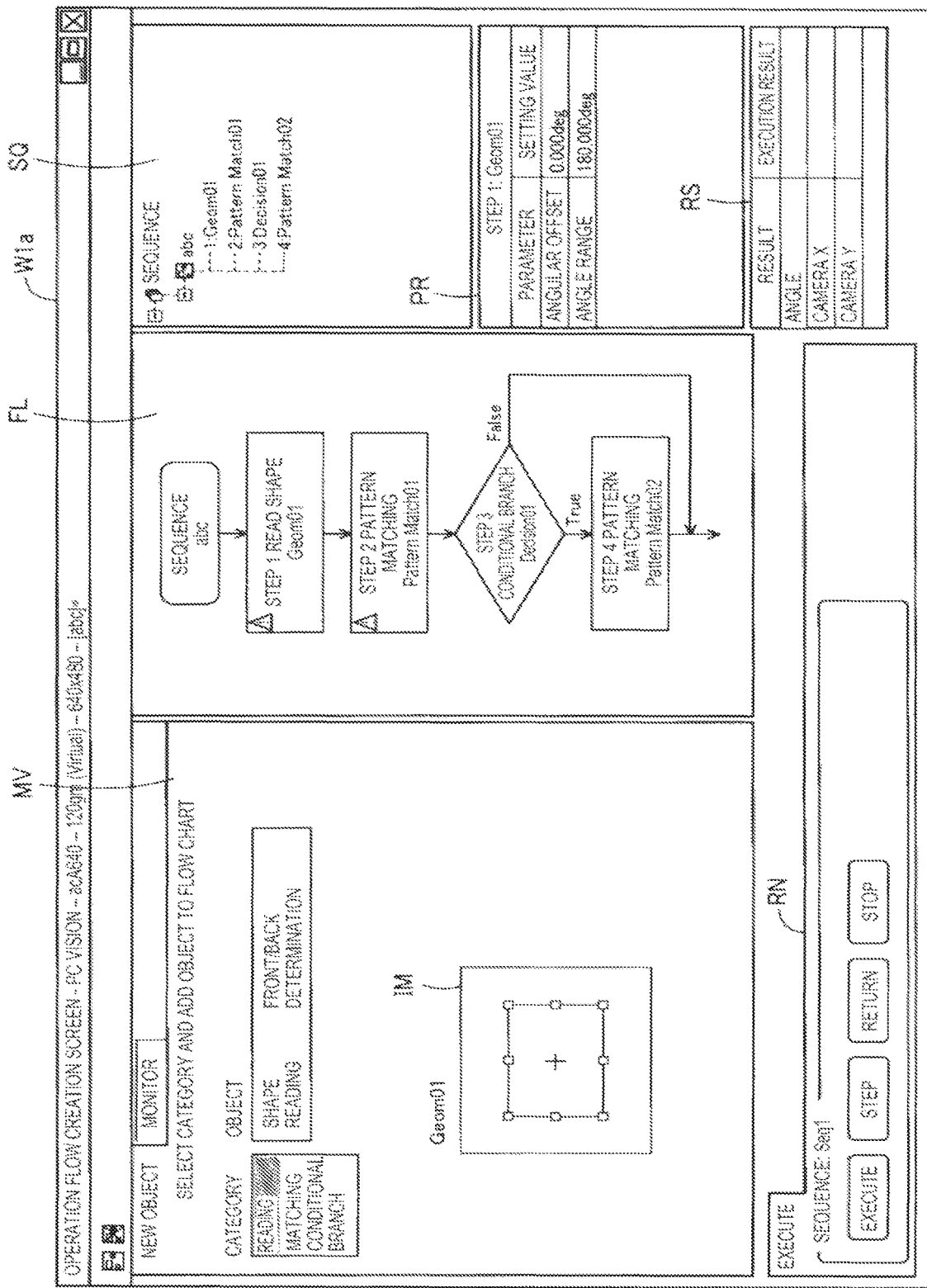
FIG. 6E is an explanatory diagram showing a procedure for creating a control program of work using a camera.

FIG. 6E shows an example of a window W1a for creating an operation flow of second type work using the camera 30. The window W1a is similar to the window W1 for the first type work shown in FIG. 6D. However, in the main view area MV, the window W1a is different from the window W1 in that a camera image display area IM for displaying an image captured with the camera 30 is provided in the main view area MV. In the camera image display area IM, it is preferable to be able to designate an image processing area to be subjected to an image processing such as product checking among the images captured with the camera 30. In this way, the load of the image processing can be reduced so that the operation of the robot can be performed at high speed. The content of areas FL, SQ, PR, RS, and RN other than the window W1a for the second type work in the main view area MV are substantially the same as the content of these areas in the window W1 for the first type work. However, content different from that of the window W1 for the first type work may be displayed. The window W1 for the first type work corresponds to a "first type input screen", and the window W1a for the second type work corresponds to a "second type input screen".

The relative position relationship of a plurality of areas MV, FL, SWQ, PR, RS, and RN of the window W1a for the second type work is the same as the relative position relationship in the window W1 for the first type work, but the relative position relationships may be different from each other. However, it is preferable that at least the relative position relationship of the operation flow creation area FL and the parameter setting area PR is set to be the same in two types of the windows W1 and W1a. Here, the "relative position relationship" means, for example, a qualitative position relationship in which the parameter setting area PR is placed at the lower right of the operation flow creation area FL. If the relative position relationship between two areas FL and PR is the same in the two types of work, the teacher can easily perform the setting work in these areas, and it is possible to easily create an operation flow and a control program for the two types of work. From this viewpoint, it is further preferable that at least the relative position relationship of the main view area MV, the operation flow creation area FL, and the parameter setting area PR is the same in the two types of windows W1 and W1a. In particular, if a configuration in which the main view area MV is placed on the left side of the operation flow creation area FL and the parameter setting area PR is placed on the right side of the operation flow creation area FL is adopted, it is preferable in that the creation of the operation flow and the setting work of the parameters by the teacher become easier.

The window W1 for the first type work (FIG. 6D) and the window W1a for the second type work (FIG. 6E) may be implemented as an input screen of a different application program, or may be implemented as an input screen of a different option of the same application program.

In the first embodiment, since an operation flow including a conditional branch can be easily created by graphically placing the operation object and the conditional branch object in the operation flow creation area FL, it is possible to easily teach recovery and end processing when the operation during the work fails. Since the operation flow is converted into a control program of the robot, it is possible to easily create a control program.

B. Other Embodiment

As another embodiment, the following modes are sequentially described.
(1) Limitation on display and input of operation parameters
(2) Setting of interruption permission timing of work
These modes are arbitrarily applicable to the first embodiment.

Figure 13A:
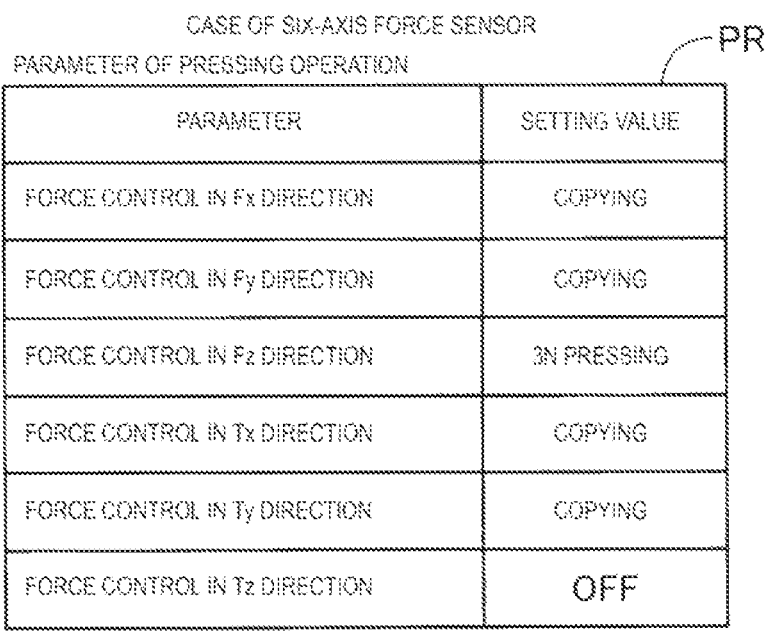
FIG. 13A is an explanatory diagram of a display example of operation parameters suitable for a six-axis force sensor.

FIG. 13A shows a display example of operation parameters in the case where a six-axis force sensor is used as the force detector 130. Here, an example in which the force control directions and the setting values are displayed in a portion of the parameter setting area PR (FIG. 6D) with respect to the pressing operation is shown. In the case of using the six-axis force sensor, it is possible to designate what kind of force control is to be executed for all the force of the six axes (force Fx, Fy, and Fz of three axes and torques Tx, Ty, and Tz around three axes).

Figure 13B:
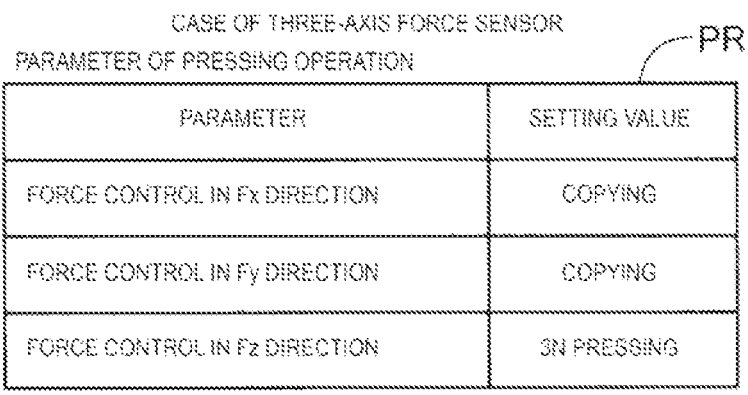
FIG. 13B is an explanatory diagram of a display example of operation parameters suitable for a three-axis force sensor.

FIG. 13B shows a display example of operation parameters in the case of using a three-axis force sensor as the force detector 130. In the case of using the three-axis force sensor, it is possible to designate what kind of force control is to be executed for the force Fx, Fy, and Fz detectable with a three-axis sensor. On the other hand, for the force (torques Tx, Ty, and Tz around three axes) undetectable with the three-axis sensor, it is preferable to set the state of those parameters to a setting disabled state. A method of setting the parameters in the setting disabled state is, as shown in FIG. 13B, not to display the parameters on the input screen. As another method, it is possible to adopt a method of setting parameters in a grayout state in the parameter setting area PR so that the setting values cannot be changed.

FIG. 14A shows another display example of operation parameters in the case of using the six-axis force sensor as the force detector 130. Here, an example in which the contacting direction (force control direction) and the setting values are displayed in a portion of the parameter setting area PR with respect to the contacting operation is shown. In the case of using the six-axis force sensor, any one direction can be selected from the directions X, Y, Z, U, V, and W of the force of six axes, and either a positive direction or a negative direction can be selected for each direction. The directions U, V, and W mean the directions of the torques Tx, Ty, and Tz.

FIG. 14B shows another display example of operation parameters in the case of using the three-axis force sensor as the force detector 130. In the case of using the three-axis force sensor, any one direction can be selected from the directions X, Y, and Z of force detectable with the three-axis sensor, and either a positive direction or a negative direction can be selected for each direction. On the other hand, for the force (torques Tx, Ty, and Tz around three axes) undetectable with the three-axis sensor, it is preferable to set the state of those parameters to a setting disabled state.

FIG. 15A is an explanatory diagram of a display example of operation parameters suitable for the six-axis robot. Here, an example in which the force control directions and the setting values are displayed in a portion of the parameter setting area PR (FIG. 6D) with respect to the pressing operation is shown. In the case of using the six-axis robot, it is possible to designate what kind of force control is to be executed for all the force of the six axes.

FIG. 15B shows a display example of operation parameters suitable for a SCARA robot which is a four-axis robot. In the case of using the SCARA robot, it is possible to designate what kind of force control is to be executed for the directions of four axes controllable by the SCARA robot. On the other hand, for the directions uncontrollable by the SCARA robot, it is preferable to set the state of those parameters to a setting disabled state.

FIG. 16A shows another display example of operation parameters suitable for the six-axis robot. Here, an example in which the contacting direction (force control direction) and the setting values are displayed in a portion of the parameter setting area PR with respect to the contacting operation is shown. In the case of using the six-axis robot, any one direction can be selected from the directions X, Y, Z, U, V, and W of the force of six axes, and either a positive direction or a negative direction can be selected for each direction.

FIG. 16B shows another display example of operation parameters suitable for the SCARA robot with four axes. In the case of using the SCARA robot, any one direction can be selected from the directions X, Y, Z, and U of the force of four axes controllable by the SCARA robot, and either a positive direction or a negative direction can be selected for each direction. On the other hand, for the directions uncontrollable by the SCARA robot, it is preferable to set the state of those parameters to a setting disabled state.

As described in FIGS. 13A to 16B, if the unnecessary parameters are set in the setting disabled state according to the type of the robot and the type of the sensor (force detector) connected to the robot control device 200, it is possible for the teacher to easily set only necessary parameters. In the case where the limitation on the display and input of the parameters according to the type of the robot and the limitation on the display and input of the parameters according to the type of the force detector are different, severer limitations are applied. For example, in the case were a three-axis force detector is provided in the six-axis robot, since the limitation by the three-axis force detector is severer, the limitation is applied. As the types of the sensor, not only the force detector 130 but also other types of sensors such as the types of the camera 30 (for example, either a monocular camera or a stereo camera) may be used.

FIG. 17A is an explanatory diagram showing an example of input prohibition of operation parameters. In this example, as parameters of pressing and probing operation (see FIG. 7), the shape of the "probing route" and the dimensions thereof are displayed in the parameter setting area PR. The shape of the "probing route" is set to be a spiral, and the diameter and the pitch value of the spiral are set as the dimension. The parameters (moving distance in X, Y, Z directions) in the case where the "probing route" is not a spiral among the parameters present in the parameter setting area PR are in the setting disabled state (here, grayout state).

FIG. 17B is an explanatory diagram showing another example of input prohibition of operation parameters. In this example, the shape of the "probing route" is set to be a straight line, and the values of the moving distances in the X, Y, and Z directions are set as the dimensions. The parameters in the case where the "probing route" is not a straight line (diameter and pitch of spiral) are in the setting disabled state (grayout state).

As shown in FIGS. 17A and 17B, when there is an unnecessary parameter according to the parameters set for a certain operation object, and the state of the parameter is changed to the setting disabled state, it is possible for the teacher to easily set only necessary parameters. In addition to setting other operation parameters in the setting disabled state according to a certain operation parameter, other work parameters may be set in the setting disabled state according to the work parameters, or a specific operation parameter may be set in the setting disabled state according to a certain work parameter.

Figure 18:
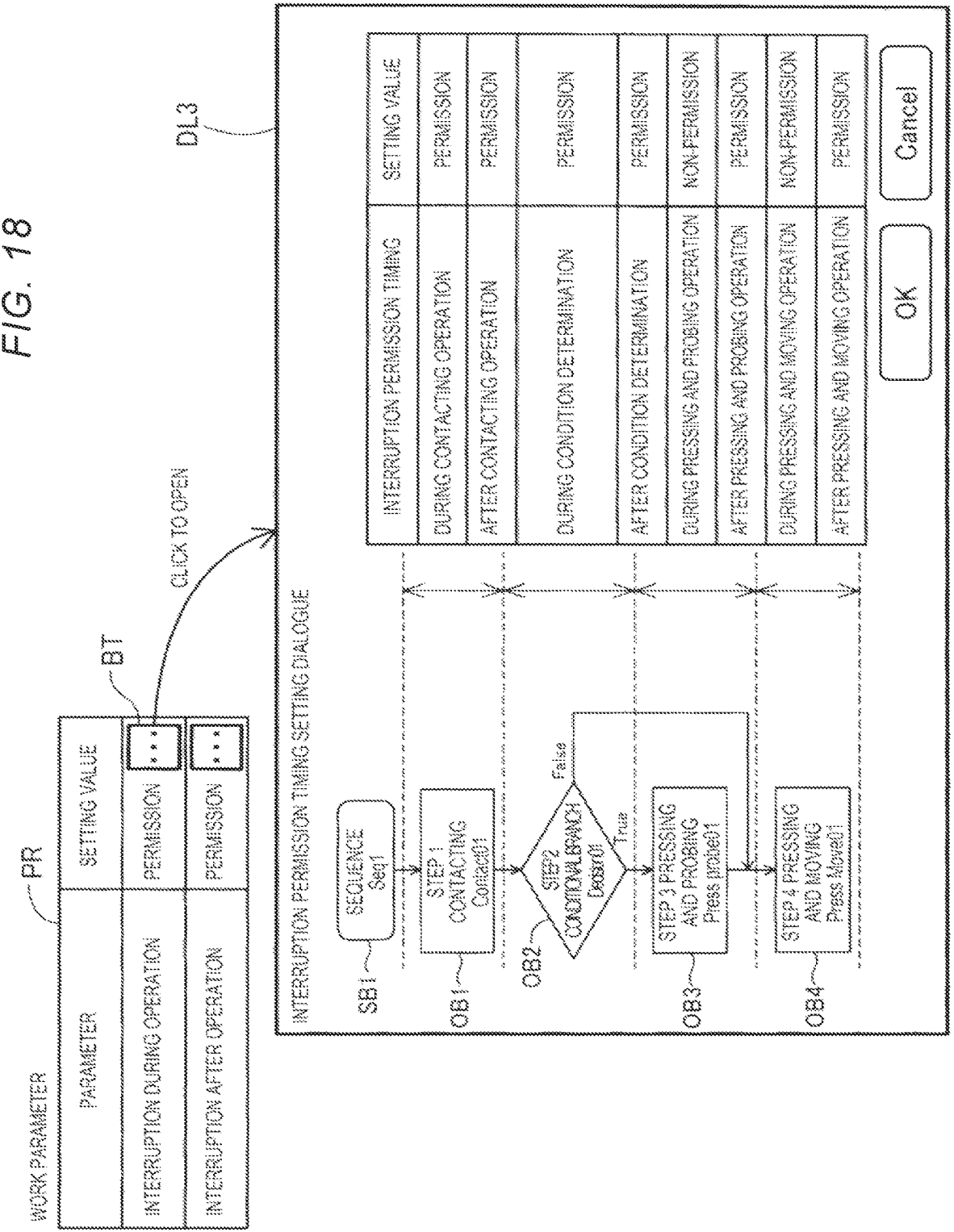
FIG. 18 is an explanatory diagram showing a setting example of an interruption permission timing of work.

FIG. 18 is an explanatory diagram showing a setting example of an interruption permission timing of work in still another embodiment. In the parameter setting area PR at the upper left of FIG. 18, two interruption permission timings of "interruption during operation" and "interruption after operation" are displayed as work parameters. For example, when either relationship display button BT of these two interruption permission timings is clicked, an interruption permission timing setting dialogue DL3 is opened, and setting values of the interruption permission timing related to each operation in the work will be displayed. The interruption permission timing related to each operation may be set in the dialogue DL3, or, one of the operation objects may be selected in the operation flow creation area FL (FIG. 6D) and set as the operation parameter of the operation in the parameter setting area PR.

The permission and non-permission of "interruption during operation", and the permission and non-permission of "interruption after operation" mean the following settings S1$e$, S1$n$, S2$e$, and S2$n$, respectively.

Setting S1$e$: permission of "interruption during operation"

It means the work is interrupted immediately when the robot control device 200 receives a temporary stop signal during execution of the operation. The temporary stop signal is a signal for requesting a temporary stop of the work of the robot 100, and for example, a signal from a sensor detecting that a safety door is opened, a sensor detecting that a person is approaching, or the like.

Setting S1$n$: non-permission of "interruption during operation"

It means even if the robot control device 200 receives the temporary stop signal during the execution of the operation, the work is not immediately interrupted, and the work is continued until the timing when "interruption during operation" or "interruption after operation" is set as permission.

Setting S2$e$: permission of "interruption after operation"

It means when the robot control device 200 receives the temporary stop signal during the execution of the operation, the work is interrupted at the end of the operation.

Setting S2$n$: non-permission of "interruption after operation"

It means even if the robot control device 200 receives the temporary stop signal during the execution of the operation, the work is not interrupted, and the work is continued until the timing when "interruption during operation" or "interruption after operation" is set as permission.

In a case where "interruption during operation" is set as permission in a certain operation (called "specific operation"), and "interruption during operation" and "interruption after operation" are set as non-permission in a previous operation of the specific operation (called "previous operation"), the work is interrupted at the start of the specific operation if the temporary stop signal is generated during the execution of the previous operation.

In the example of FIG. 18, permission or non-permission of the interruption permission timing is set for each of the four objects OB1 to OB4. Such an interruption permission timing is set in order to interrupt the work at an appropriate timing suitable for the content of the operation in the work when a temporary stop signal is generated during the work. For example, if the polishing operation is interrupted during the work when the temporary stop signal is received during the polishing operation, polishing unevenness occurs. For example, if non-permission is set for "interruption during operation" for the operations executing polishing (pressing and moving operation), and permission is set for "interruption after operation", the work of the polishing operation is not interrupted until the end, so that it is possible to prevent occurrence of defects such as polishing unevenness. Like the polishing operation, since there are cases where defection can occur when the work is interrupted during the operation for the work using the force control, it is preferable that the interruption permission timing can be appropriately set. Such setting of the interruption permission timing is difficult to set in the case of directly inputting the control program of the robot, but there is an advantage that it is comparatively easy to perform setting in the case of setting content of work using an operation flow (sequence) including one or more operation objects.

Depending on the work, there may be cases where the interruption is not required during the period of executing a plurality of operations. For example, a case where a plurality of operation objects (for example, pressing and moving object) are placed in the operation flow for polishing so as to divide the polishing into a plurality of operations to execute can be considered. In the case where no interruption is required until the end of the entire operations of the plurality of operation objects, non-permission for both of "interruption during operation" and "interruption after operation" for the operation objects other than the final operation object is set among the plurality of operation objects for polishing, and non-permission for "interruption during operation" and permission for "interruption after operation" for the final operation object are set. In this manner, it is possible to reduce the possibility of occurrence of product defection due to the interruption of the work during the polishing.

Both "interruption during operation" and "interruption after operation" may be set, or only one of these may be set as the interruption permission timing.

Figure 19A:
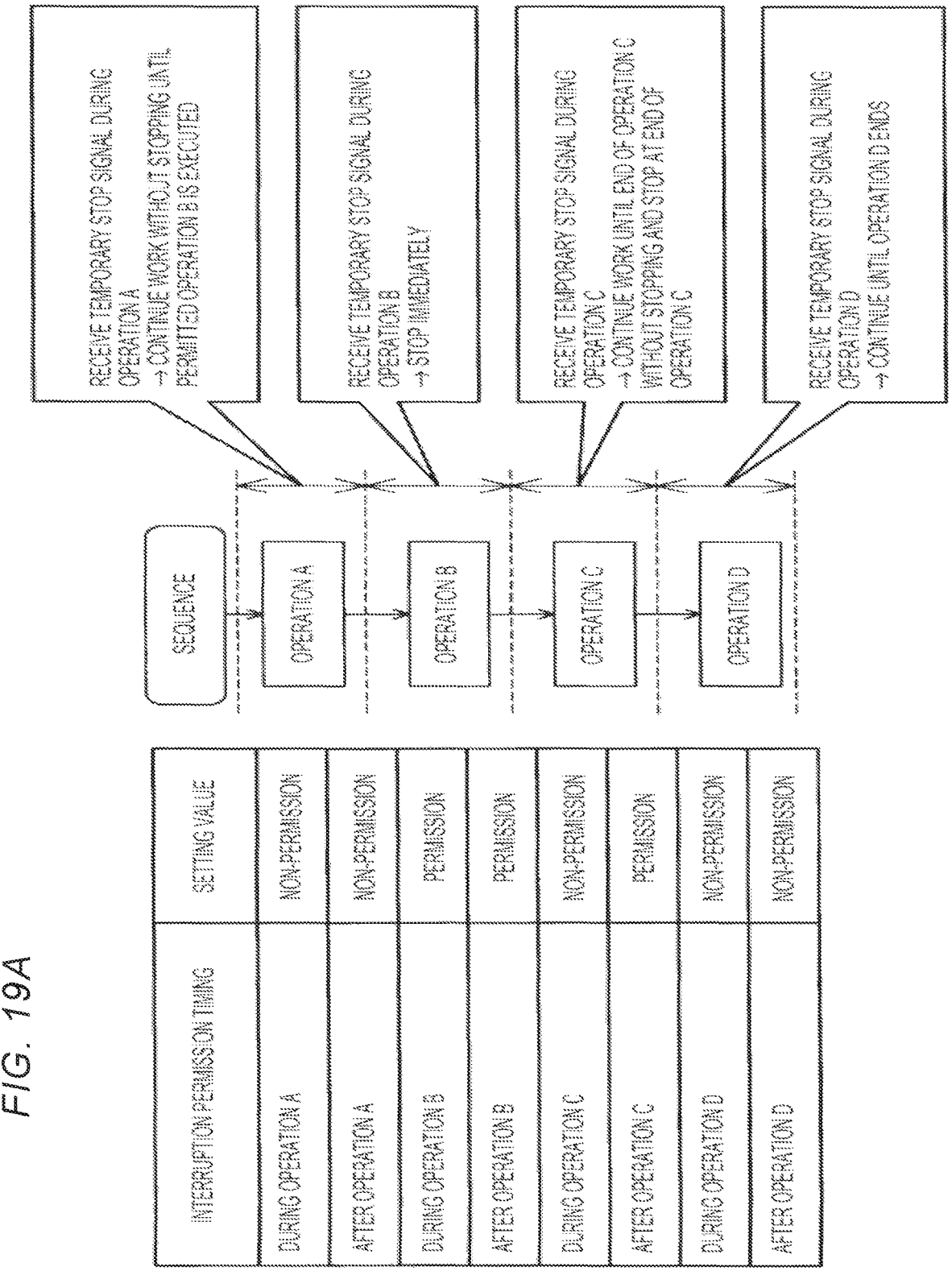
FIG. 19A is an explanatory diagram of operations according to setting of interruption permission timing of work.

FIG. 19A shows a setting example in a mode in which it is possible to set both "interruption during operation" and "interruption after operation". The determination of interrupting the work in the mode is the same as the content of the above-described settings S1$e$, S1$n$, S2$e$, and S2$n$. In the case where none of the interruption permission timing on the final operation D in the operation flow is set as permission, and a temporary stop signal is received during the operation D, it is preferable that the operation of the robot 100 is interrupted at the end of the final operation D.

Figure 19B:
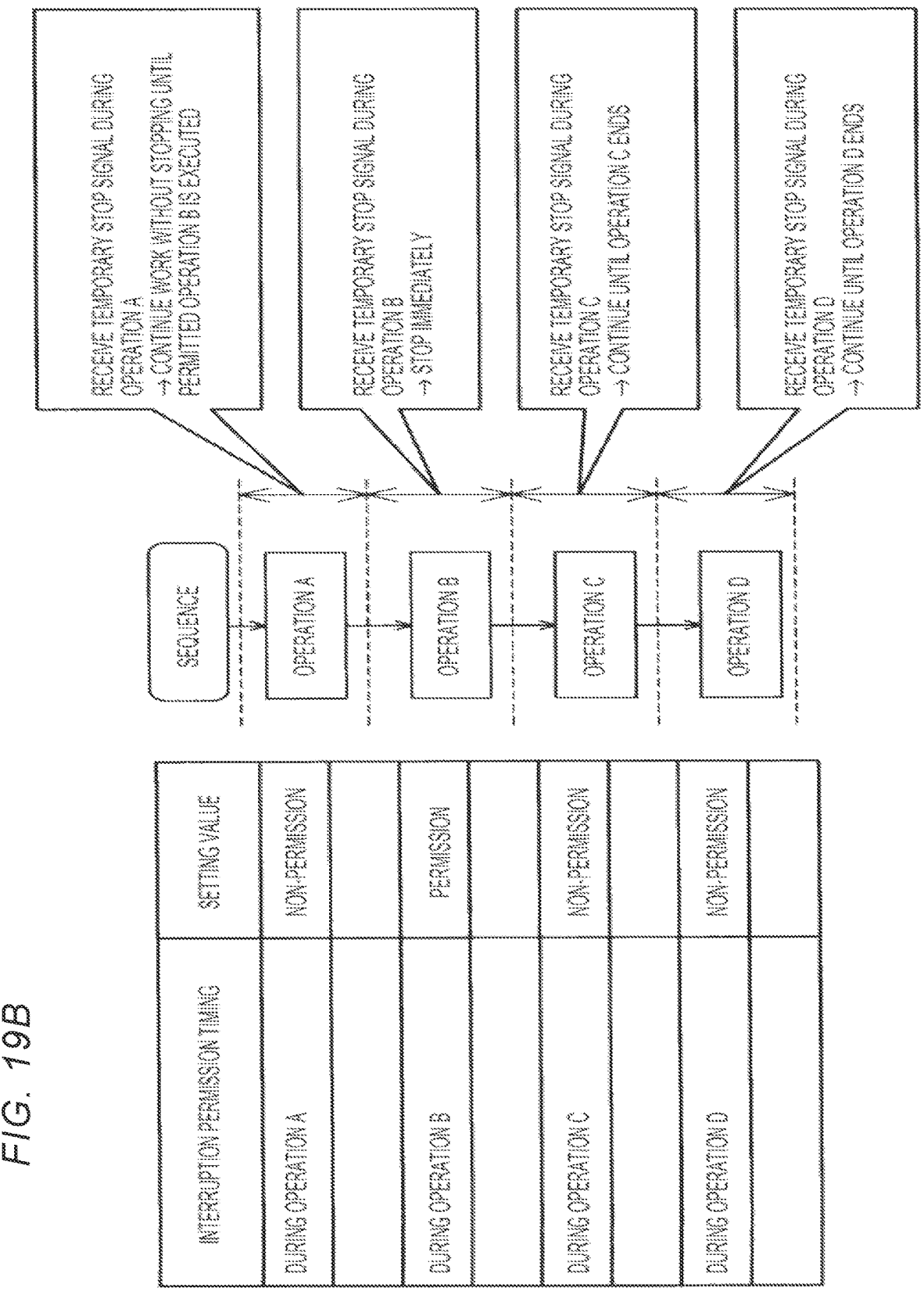
FIG. 19B is an explanatory diagram of operations according to the setting of the interruption permission timing of work.

FIG. 19B shows a setting example in a mode where only "interruption during operation" can be set. The determination of interrupting the work in the mode is the same as the content of the above-described settings S1$e$ and S1$n$.

Figure 19C:
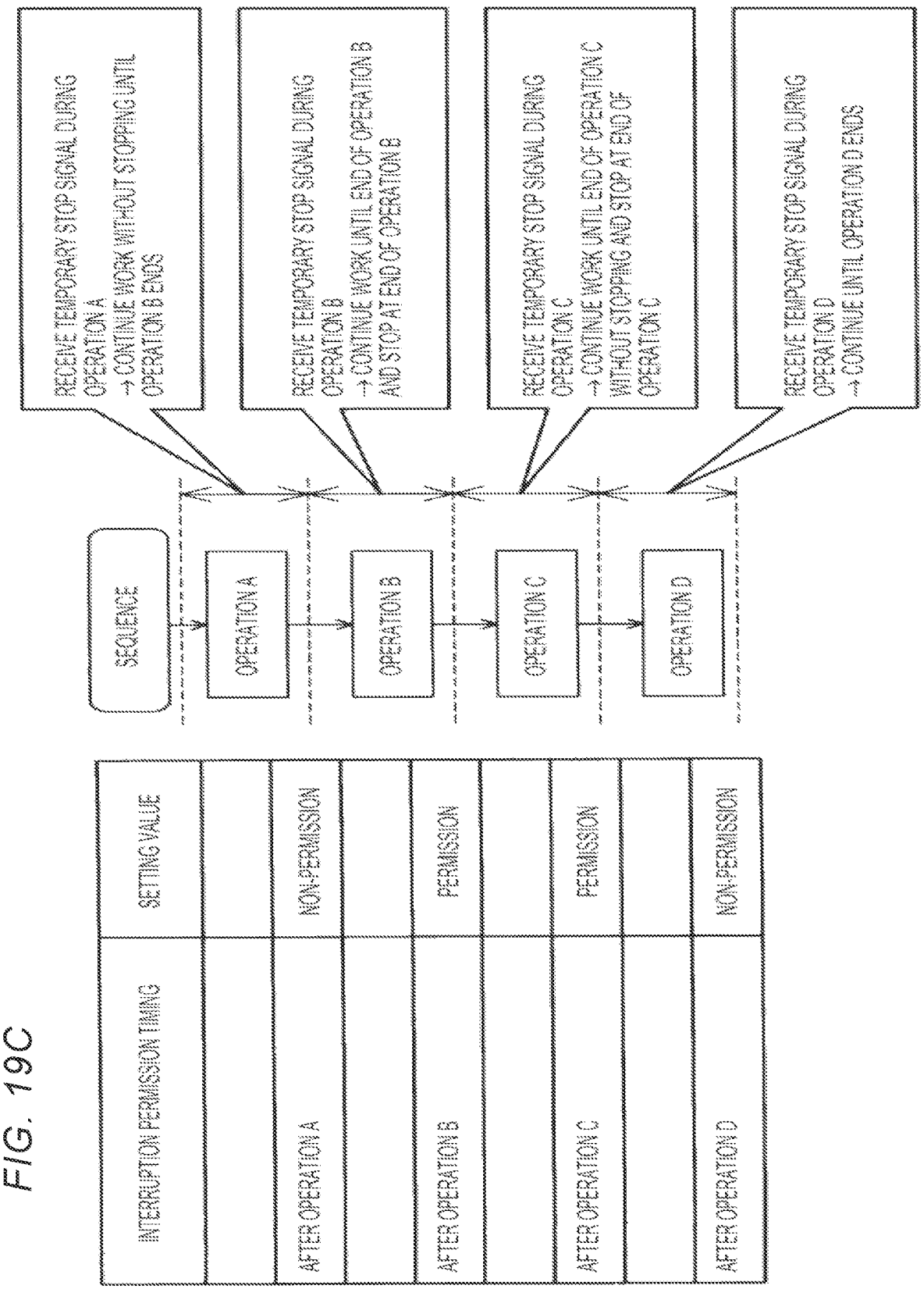
FIG. 19C is an explanatory diagram of operations according to the setting of the interruption permission timing of the work.

FIG. 19C shows a setting example in the mode where only "interruption after operation" can be set. The determination of interrupting the work in the mode is the same as the content of the above-described settings S2$e$ and S2$n$.

If the setting of the interruption permission timing is possible for the force control operations during the work, it is possible to execute the interruption of the work at a preferable timing when the robot control device 200 receives the temporary stop signal from the outside. Accordingly, it is possible to easily create a control program capable of reducing the possibility of occurrence of defects such as product defection.

The invention is not limited to the above-described embodiments, examples, and modification examples, and can be realized in various configurations without departing from the gist thereof. For example, the technical features in the embodiments, examples, and modification examples corresponding to the technical features in each mode described in the Summary of the Invention can be replaced or combined as appropriate to solve part or all of the above-mentioned problems, or to achieve some or all of the above-mentioned effects. Also, unless its technical features are described as essential in this specification, it can be deleted as appropriate.

The entire disclosure of Japanese Patent Application No. 2018-011357, filed Jan. 26, 2018, is expressly incorporated by reference herein.

What is claimed is:

1. A robot control device comprising:
   an input device through which an instruction is input;
   a display having a first area and a second area, the first area being configured to display a plurality of operation objects corresponding to operations using force control of a robot having a force detector and a conditional branch object corresponding to a conditional operation of the robot, the second area being configured to display an object operation flow corresponding to a robot operation flow of the robot;
   a memory configured to store a program; and
   a processor configured to execute the program so as to:
   cause the first area of the display to display the plurality of operation objects and the conditional operation object;
   receive an input as the instruction via the input device;
   select an object of the plurality of operation objects and the conditional operation object based on the input;
   cause the second area of the display to display the selected object as a part of the object operation flow;
   repeat the receiving of the input, the selecting of the object, and the causing of the second area to display the selected object a predetermined number of times to complete the object operation flow;
   convert the completed object operation flow into a control program, the control program being configured to control the operations of the robot; and
   execute the control program to control the robot.

2. The robot control device according to claim 1,
   wherein the display further includes a parameter setting area in which a parameter defining one of the operations and the conditional operation corresponding to the plurality of operation objects and the conditional branch object is set.

3. The robot control device according to claim 2,
   wherein the first area of the display is configured to be switched between a first type image and a second type image,
   when the first area displays the first type image, the plurality of operation objects corresponding to the operations for using the force control of the force detector are displayed, and
   when the first area displays the second type image, the plurality of operation objects corresponding to the operations for using a camera are displayed.

4. The robot control device according to claim 2,
   wherein the processor is further configured to set the parameter in the parameter setting area defining an end condition for ending one of the operations and the parameter in the parameter setting area defining a success determination condition for determining whether or not one of the operations succeeds.

5. The robot control device according to claim 4,
   wherein, when the first area displays the plurality of operation objects corresponding to the operations using force control of the force detector, the end condition or the success determination condition includes a condition for executing determination based on a frequency of force measured by the force detector.

6. The robot control device according to claim 2,
   wherein, when the processor determines that an unacceptable parameter value is included in the parameter in the parameter setting area, the processor is configured to display an alarm on an operation object of the plurality of operation objects indicating an operation in which the unacceptable parameter value is set in the object operation flow in the second area.

7. The robot control device according to claim 2,
   wherein the processor is configured to:
   display a plurality of parameters in the parameter setting area for defining each operation object included in the object operation flow;
   set one or more of the plurality of parameters for the plurality of operation objects as the set parameters, and the plurality of parameters are divided into the set parameters and other parameters; and
   change a state of the other parameters to a setting disabled state in which the other parameters are not set as the set parameters when the processor sets the one or more of the plurality of parameters as the set parameters.

8. The robot control device according to claim 7,
   wherein the processor is configured to:
   identify a type of the robot connected to the robot control device; and
   change a state of a corresponding one of the plurality of parameters to the setting disabled state according to the identified type of the robot.

9. The robot control device according to claim 7,
   wherein the processor is configured to:
   identify a type of a sensor provided in the robot; and
   change a state of a corresponding one of the plurality of parameters to the setting disabled state according to the identified type of the sensor.

10. The robot control device according to claim 2,
    wherein the processor is configured to:
    set a work parameter of the operations of the robot via the parameter setting area; and
    set one of the operations corresponding to the plurality of operation objects included in the object operation flow based on the set work parameter.

11. The robot control device according to claim 1,
    wherein, with respect to the operation using the force detector, the processor is configured to set an interruption permission timing for canceling the operation using the force detector when the robot control device receives a temporary stop signal from an outside source.

12. A robot system comprising:
    a robot with a force detector; and
    a robot control device including:
    an input device through which an instruction is input;
    a display having a first area and a second area, the first area being configured to display a plurality of operation objects corresponding to operations using force control of a robot having a force detector and a conditional branch object corresponding to a conditional operation of the robot, the second area being configured to display an object operation flow corresponding to a robot operation flow of the robot;

a memory configured to store a program; and
a processor configured to execute the program so as to:
- cause the first area of the display to display the plurality of operation objects and the conditional operation object;
- receive an input as the instruction via the input device;
- select an object of the plurality of operation objects and the conditional operation object based on the input;
- cause the second area of the display to display the selected object as a part of the object operation flow;
- repeat the receiving of the input, the selecting of the object, and the causing of the second area to display the selected object a predetermined number of times to complete the object operation flow;
- convert the completed object operation flow into a control program, the control program being configured to control the operations of the robot; and
- execute the control program to control the robot.

* * * * *